US007882518B2

(12) United States Patent
Finseth et al.

(10) Patent No.: US 7,882,518 B2
(45) Date of Patent: *Feb. 1, 2011

(54) METHOD AND APPARATUS FOR TRANSMISSION, RECEIPT AND DISPLAY OF ADVERTISEMENTS

(75) Inventors: Craig A. Finseth, St. Paul, MN (US); Philip E. Hsiao, Eden Prairie, MN (US); Jeffrey A. Brown, Roseville, MN (US); Robert G. Arsenault, Redondo Beach, CA (US); Tam T. Leminh, Cypress, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/418,409

(22) Filed: Apr. 3, 2009

(65) Prior Publication Data
US 2009/0193458 A1    Jul. 30, 2009

Related U.S. Application Data

(62) Division of application No. 09/532,755, filed on Mar. 22, 2000, now Pat. No. 7,522,458.

(60) Provisional application No. 60/126,573, filed on Mar. 29, 1999.

(51) Int. Cl.
*H04N 5/445*     (2006.01)
*G06Q 30/00*     (2006.01)

(52) U.S. Cl. ......................... 725/34; 705/14.4
(58) Field of Classification Search ............. 725/32, 725/37, 42
See application file for complete search history.

(56) References Cited

U.S. PATENT DOCUMENTS

| 4,694,490 | A |   | 9/1987  | Harvey et al.     |
|-----------|---|---|---------|-------------------|
| 5,153,580 | A |   | 10/1992 | Pollack           |
| 5,223,924 | A | * | 6/1993  | Strubbe ....... 725/46 |
| 5,251,332 | A |   | 10/1993 | Hansen            |
| 5,260,778 | A |   | 11/1993 | Kauffman et al.   |
| 5,319,707 | A |   | 6/1994  | Wasilewski et al. |
| 5,345,594 | A |   | 9/1994  | Tsuda             |
| 5,410,344 | A |   | 4/1995  | Graves et al.     |
| 5,440,632 | A |   | 8/1995  | Bacon et al.      |
| 5,446,919 | A |   | 8/1995  | Wilkins           |
| 5,497,206 | A |   | 3/1996  | Ji                |

(Continued)

FOREIGN PATENT DOCUMENTS

EP       1030463       6/2000

(Continued)

*Primary Examiner*—James Sheleheda

(57) ABSTRACT

An apparatus for the intelligent display of advertisements to a television services user includes a transmitter, a receiver and a display on which an electronic television program guide, television programs, and advertisements are displayed. Advertising and electronic program guide data are transmitted to a receiver used by one or more television service users. The electronic program guide data includes information characterizing television programs listed in an electronic program guide. Similarly, the advertising data includes advertisements and information characterizing the transmitted advertisements. A selection history contains information characterizing those programs selected by a user for viewing. Received advertisements are displayed to the user based upon a comparison between the information characterizing each of the plurality of advertisements and the information in the selection history.

18 Claims, 20 Drawing Sheets

U.S. PATENT DOCUMENTS

| | | |
|---|---|---|
| 5,559,548 A | 9/1996 | Davis et al. |
| 5,563,648 A | 10/1996 | Menand et al. |
| 5,583,562 A | 12/1996 | Birch et al. |
| 5,583,563 A | 12/1996 | Wanderscheid et al. |
| 5,589,892 A | 12/1996 | Knee et al. |
| 5,603,077 A | 2/1997 | Muckle et al. |
| 5,619,250 A | 4/1997 | McClellan et al. |
| 5,625,693 A | 4/1997 | Rohatgi et al. |
| 5,625,864 A | 4/1997 | Budow et al. |
| 5,631,903 A | 5/1997 | Dianda et al. |
| 5,635,978 A | 6/1997 | Alten et al. |
| 5,666,293 A | 9/1997 | Metz et al. |
| 5,671,411 A | 9/1997 | Watts et al. |
| 5,686,954 A | 11/1997 | Yoshinobu et al. |
| 5,724,521 A | 3/1998 | Dedrick |
| 5,734,589 A | 3/1998 | Kostreski et al. |
| 5,740,549 A | 4/1998 | Reilly et al. |
| 5,742,680 A | 4/1998 | Wilson |
| 5,760,820 A | 6/1998 | Eda et al. |
| 5,767,913 A | 6/1998 | Kassatly |
| 5,768,539 A | 6/1998 | Metz et al. |
| 5,774,170 A | 6/1998 | Hite et al. |
| 5,798,785 A | 8/1998 | Hendricks et al. |
| 5,838,314 A | 11/1998 | Neel et al. |
| 5,848,396 A | 12/1998 | Gerace |
| 5,848,397 A | 12/1998 | Marsh et al. |
| 5,864,747 A | 1/1999 | Clark et al. |
| 5,886,995 A | 3/1999 | Arsenault et al. |
| 5,892,508 A | 4/1999 | Howe et al. |
| 5,892,536 A | 4/1999 | Logan et al. |
| 5,894,320 A | 4/1999 | Vancelette |
| 5,909,437 A | 6/1999 | Rhodes et al. |
| 5,923,362 A | 7/1999 | Klosterman |
| 5,940,737 A | 8/1999 | Eastman |
| 5,951,639 A | 9/1999 | MacInnis |
| 5,959,623 A | 9/1999 | Van Hoff et al. |
| 5,978,037 A | 11/1999 | Hilpert et al. |
| 5,978,855 A | 11/1999 | Metz et al. |
| 6,005,597 A | 12/1999 | Barrett et al. |
| 6,009,116 A | 12/1999 | Bednarek et al. |
| 6,009,307 A | 12/1999 | Granata et al. |
| 6,011,597 A | 1/2000 | Kubo |
| 6,029,045 A | 2/2000 | Picco et al. |
| 6,052,554 A | 4/2000 | Hendricks et al. |
| 6,055,514 A | 4/2000 | Wren |
| 6,064,376 A | 5/2000 | Berezowski et al. |
| 6,067,107 A | 5/2000 | Travaille |
| 6,067,440 A | 5/2000 | Diefes |
| 6,084,628 A | 7/2000 | Sawyer |
| 6,101,171 A | 8/2000 | Yoshida et al. |
| 6,133,909 A | 10/2000 | Schein et al. |
| 6,160,546 A | 12/2000 | Thompson et al. |
| 6,160,988 A | 12/2000 | Shroyer |
| 6,166,728 A | 12/2000 | Haman et al. |
| 6,169,877 B1 | 1/2001 | Gulla' |
| 6,172,674 B1 | 1/2001 | Etheredge |
| 6,172,972 B1 | 1/2001 | Birdwell et al. |
| 6,177,931 B1 | 1/2001 | Alexander et al. |
| 6,208,636 B1 | 3/2001 | Tawil et al. |
| 6,209,129 B1 | 3/2001 | Carr et al. |
| 6,212,682 B1 | 4/2001 | Kuno |
| 6,216,265 B1 | 4/2001 | Roop et al. |
| 6,240,555 B1 | 5/2001 | Shoff et al. |
| 6,263,506 B1 | 7/2001 | Ezaki et al. |
| 6,282,713 B1 | 8/2001 | Kitsukawa et al. |
| 6,310,661 B1 | 10/2001 | Arsenault |
| 6,331,876 B1 | 12/2001 | Koster et al. |
| 6,331,979 B1 | 12/2001 | Dillon et al. |
| 6,348,932 B1 | 2/2002 | Nishikawa et al. |
| 6,363,525 B1 | 3/2002 | Dougherty et al. |
| 6,408,437 B1 | 6/2002 | Hendricks et al. |
| 6,426,779 B1 | 7/2002 | Noguchi et al. |
| 6,430,165 B1 | 8/2002 | Arsenault |
| 6,460,181 B1 | 10/2002 | Donnelly |
| 6,462,784 B1 | 10/2002 | Kohno et al. |
| 6,463,468 B1 | 10/2002 | Buch et al. |
| 6,469,753 B1 | 10/2002 | Klosterman et al. |
| 6,481,010 B2 | 11/2002 | Nishikawa et al. |
| 6,553,178 B2 * | 4/2003 | Abecassis .................. 386/83 |
| 6,588,013 B1 | 7/2003 | Lumley et al. |
| 6,675,384 B1 | 1/2004 | Block et al. |
| 6,698,020 B1 | 2/2004 | Zigmond et al. |
| 6,738,978 B1 | 5/2004 | Hendricks et al. |
| 7,552,458 B1 * | 6/2009 | Finseth et al. .................. 725/34 |
| 2002/0010930 A1 | 1/2002 | Shah-Nazaroff |
| 2002/0049972 A1 | 4/2002 | Kimoto |
| 2002/0059602 A1 | 5/2002 | Macrae |
| 2002/0073424 A1 | 6/2002 | Ward, III et al. |
| 2002/0095676 A1 | 7/2002 | Knee et al. |
| 2002/0120933 A1 | 8/2002 | Knudson et al. |
| 2003/0135853 A1 | 7/2003 | Goldman |

FOREIGN PATENT DOCUMENTS

| | | |
|---|---|---|
| WO | WO 97/12486 | 4/1997 |
| WO | WO 97/17774 | 5/1997 |
| WO | WO 99/01984 | 1/1999 |
| WO | WO 99/04561 | 1/1999 |

* cited by examiner

SELECT VIEWER:

FATHER ← 112A
MOTHER ← 112B
SISTER ← 112C
BROTHER ← 112D

FIG. 5

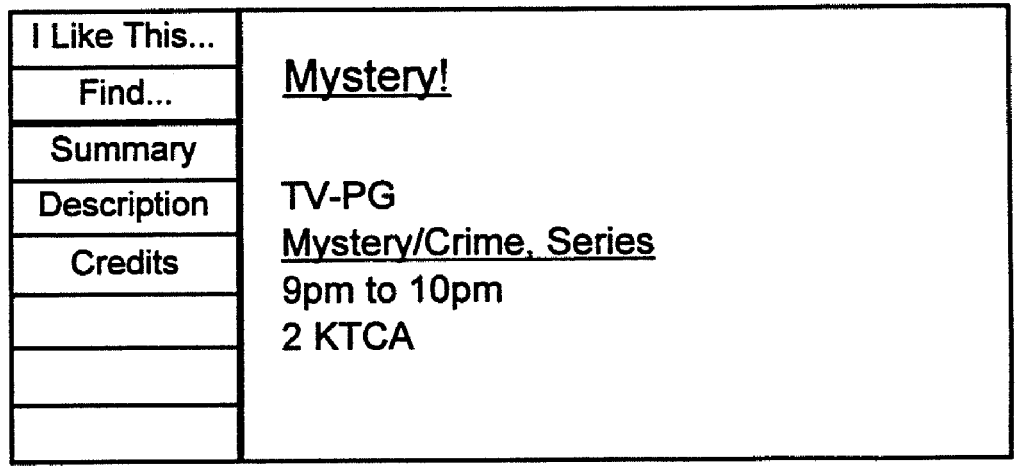
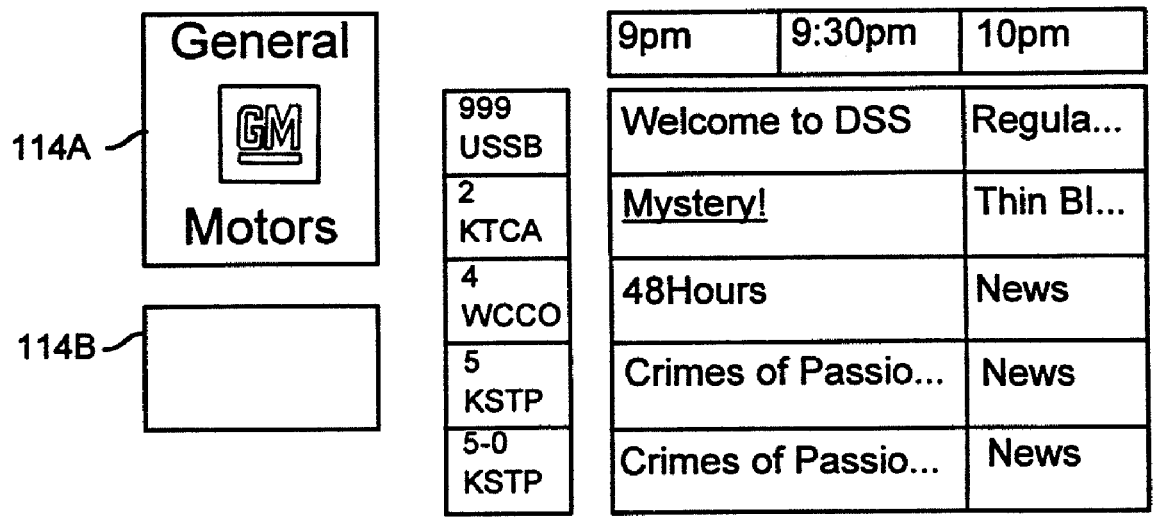
FIG. 6

METHOD AND APPARATUS FOR TRANSMISSION, RECEIPT AND DISPLAY OF ADVERTISEMENTS

RELATED APPLICATION

This application is a divisional of U.S. utility patent application Ser. No. 09/532,755 filed Mar. 22, 2000, now U.S. Pat. No. 7,552,458, which claims priority to U.S. provisional patent application Ser. No. 60/126,573, filed on Mar. 29, 1999 entitled "Method and Apparatus for Transmission, Receipt and Display of Advertisements."

BACKGROUND OF THE INVENTION

The present invention relates to the provision of television content and advertising to a receiver unit. Television programs are distributed to viewers by a variety of broadcasting methods. These methods include traditional analog broadcast television (National Television Systems Committee or "NTSC" standard), the upcoming digital broadcast television (Advanced Television Systems Committee or "ATSC" standard), cable television (both analog and digital), satellite broadcasting (both analog and digital), as well as other methods. These methods allow channels of television content to be multiplexed and transmitted over a common transmission medium.

Channel numbers are typically used to identify the stream of television content offered by a content provider. Program guide information is typically transmitted along with the television content. The program guide information includes a set of channel definition parameters that define which portions of the transmitted television content are associated with the various channels, and typically also includes schedule information for display on users' televisions. The schedule information informs users what television programs are currently on, and what television programs will be shown in the near future.

It would be desirable in a television broadcast system to be able to broadcast advertisements that are directed only to particular users, with each receiver determining whether the advertisement is appropriate for display based on characteristics such as geographic region of the receiver, subscription information and past viewing history. Specifically, using these characteristics, it would also be desirable that each receiver determines which broadcast advertisements are shown to a particular user, and when and how the broadcast advertisements are shown to that particular user.

SUMMARY OF THE INVENTION

The present invention is a method and apparatus for transmitting, receiving and displaying television content and advertising. The apparatus includes a transmission station and a plurality of receiver stations. The transmission station creates program guide data and advertising data that is in an "object" format. The transmission station combines the program guide and advertising objects with digital audio and video television signals, and transmits an output stream to the plurality of receiver stations. Each of the plurality of receiver stations receives the transmitted output stream and identifies the electronic program guide objects and advertising objects within the output stream. Each of the plurality of receiver stations stores the identified electronic program guide and advertising objects.

The present invention varies the display of advertisements in the electronic program guide depending on the user. In the present invention, the receiver identifies the user who is watching, that user's viewing history and preferences, which advertisements have already been shown to that viewer, and which channels the viewer is currently looking at in the electronic program guide, and uses the identified information to determine which advertisements will be shown to that particular user. The receiver also uses the identified information to select the best timing, placement, and size of advertising shown to a particular user. Broadcast advertising which the receiver determines poorly matches a user may be discarded in favor of what the receiver determines better matches that viewer, thereby making better use of the finite memory space available to the receiver, and better use of advertising time and space in the electronic program guide.

BRIEF DESCRIPTION OF THE DRAWINGS

FIG. 5 is an example of a user identification screen.

FIG. 6 is a diagram of a preferred embodiment of advertisements displayed in an electronic television program guide.

DETAILED DESCRIPTION

Figure 1:
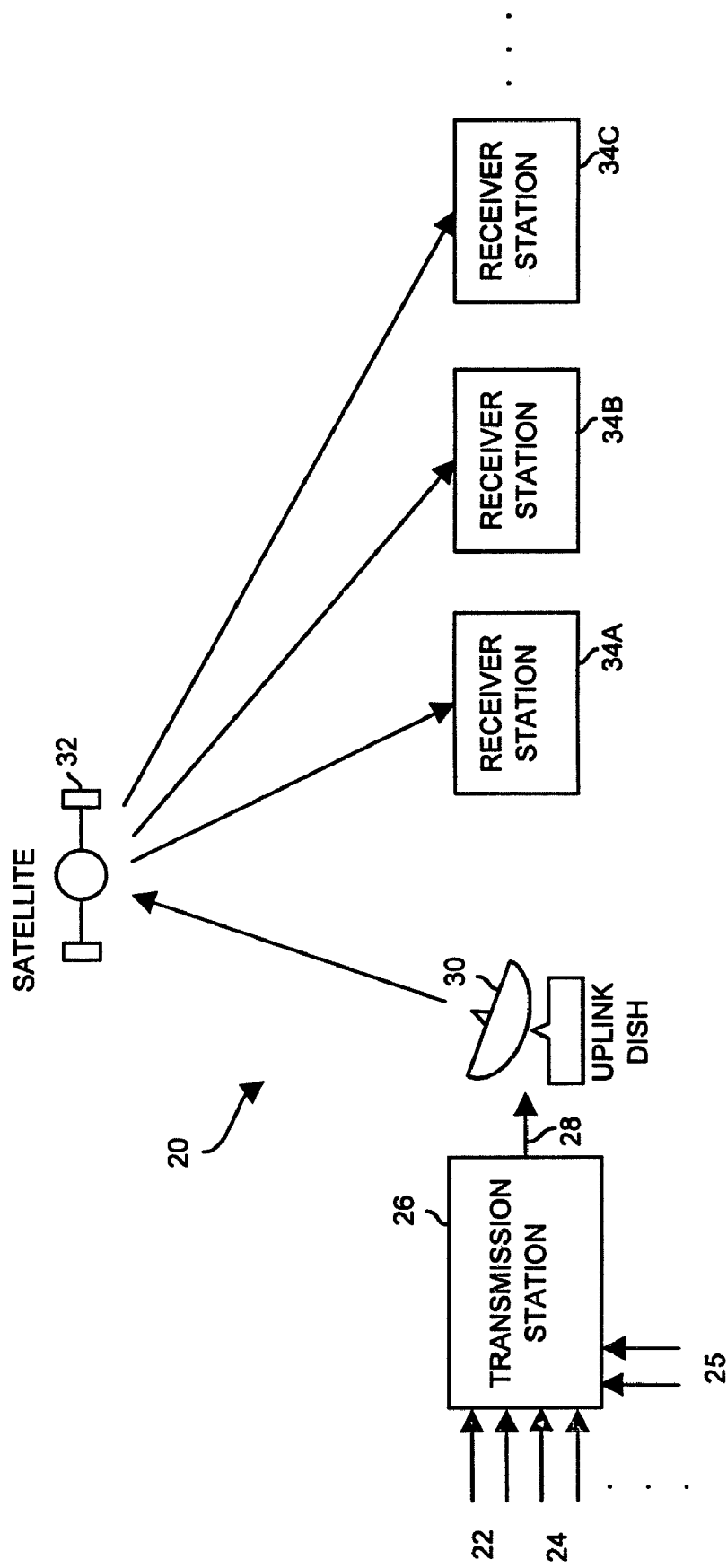
FIG. 1 is a block diagram of a preferred embodiment of a television broadcasting system for the transmission, receipt and display of television content and electronic program guide data.

I. Transmission of Television Content, Program Guide Data and Advertising Data FIG. 1 is a block diagram of television broadcasting system 20, which transmits and receives audio, video and data signals via satellite. Although the present invention is described in the context of a satellite-based television broadcasting system, the techniques described herein are equally applicable to other methods of television content delivery, such as over-the-air systems and cable-based systems.

Television broadcasting system 20 includes transmission station 26, uplink dish 30, satellite 32, and receiver stations 34A-34C (collectively referred to as receiver stations 34). Transmission station 26 includes a plurality of input lines 22 for receiving various signals, such as analog television signals, digital television signals, video tape signals, original programming signals, and computer generated signals containing HTML content and digital video server signals. Each input line 22 typically corresponds to a single television channel. Transmission station 26 also includes a plurality of schedule feeds 24 and advertising feeds 25. Schedule feeds 24 provide electronic schedule information about the timing and content of various television channels, such as that found in television schedules contained in newspapers and television guides. Advertising feeds 25 provide advertising data and information about the content of individual advertisements. The electronic schedule information from schedule feeds 24 is converted into program guide data by transmission station 26. Similarly, information from advertising feeds 25 is converted into advertising data by transmission station 26.

Transmission station 26 receives and processes the various input signals received on input lines 22, advertising feeds 25 and schedule feeds 24, converts the received signals into a standard form, combines the standard signals into a single output data stream 28, and continuously sends output data stream 28 to uplink dish 30. Output data stream 28 is preferably a modulated signal, which is modulated by transmission station 26 using standard frequency and polarization modulation techniques. In a preferred embodiment, output data stream 28 is a multiplexed signal including 16 frequency bands. Transmission station 26 is described in further detail below with respect to FIG. 2.

Uplink dish 30 continuously receives output data stream 28 from transmission station 26, amplifies the received signal and transmits the signal to satellite 32. Although a single uplink dish and satellite are shown in FIG. 2, multiple dishes and satellites are preferably used to provide additional bandwidth, and to help ensure continuous delivery of signals.

Satellite 32 revolves in geosynchronous orbit about the earth. Satellite 32 includes a plurality of transponders that receive signals transmitted by uplink dish 30, amplify the received signals, frequency shift the received signals to higher frequency bands, and then transmit the amplified, frequency shifted signals back to receiver stations 34. A total of 32 transponders are preferably used in the present invention.

Receiver stations 34 receive and process the signals transmitted by satellite 32. Receiver stations 34 include hardware and software for separating the electronic program guide data and advertising data from the received signals, and processing both the electronic program guide data and the advertising data. Receiver stations 34 are described in further detail below with respect to FIG. 4.

Figure 2:
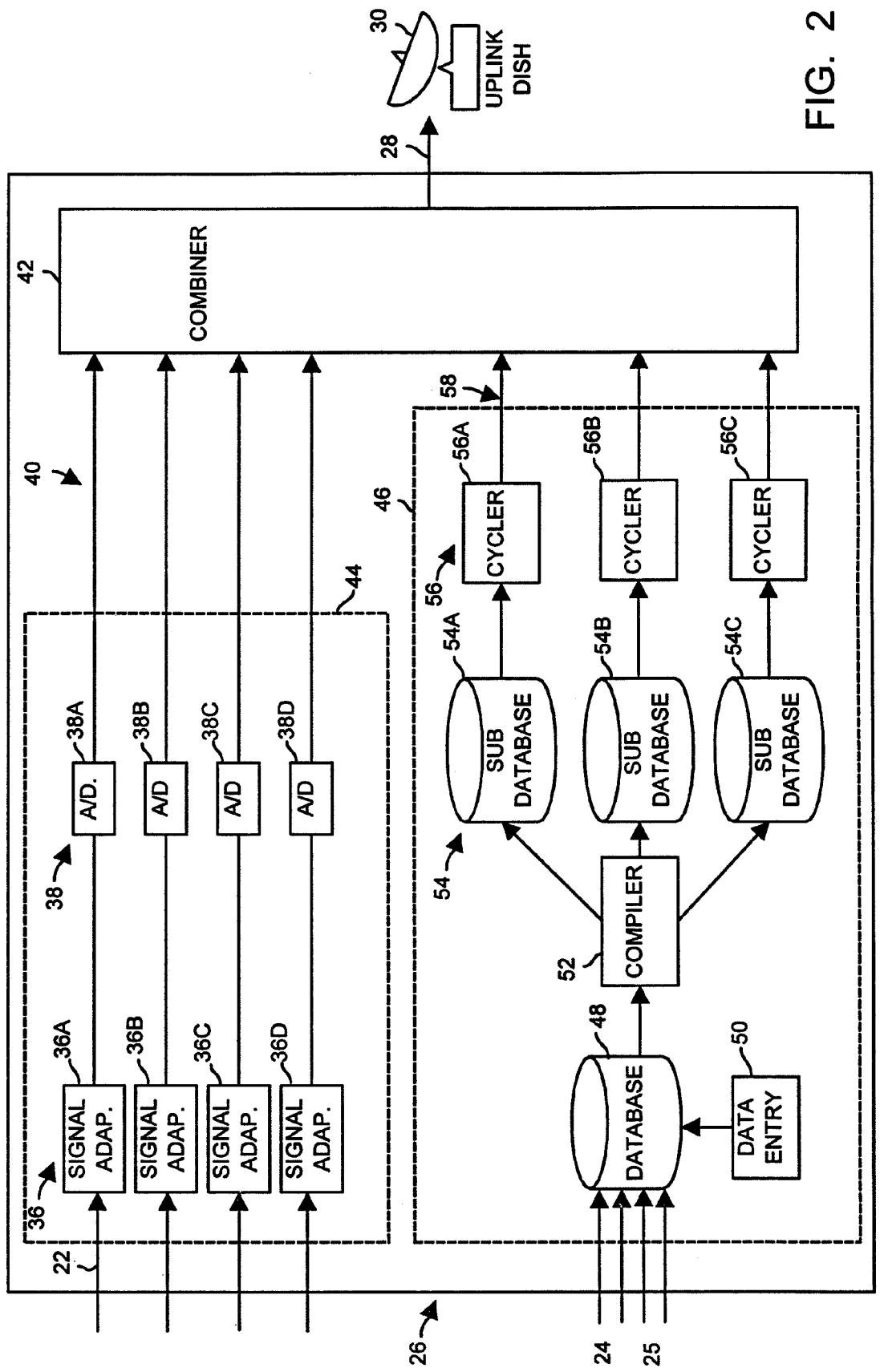
FIG. 2 is a block diagram of the transmission station of the system shown in FIG. 1.

FIG. 2 is a block diagram of transmission station 26. Transmission station 26 includes program transmitting system 44 and advertisement and program guide transmitting system 46.

Program transmitting system 44 includes input signal adapters 36A-36D (collectively referred to as input signal adapters 36), analog to digital (A/D) converters 38A-38D (collectively referred to as A/D converters 38), and combiner 42. Input signal adapters 36 are coupled to A/D converters 38, and A/D converters 38 are coupled to combiner 42. Although four input signal adapters 36 and four A/D converters 38 are shown in FIG. 2, several more will typically be used in commercial systems.

Input signal adapters 36 receive input signals from input lines 22, and convert the input signals to a standard form. As mentioned above, signals from input lines 22 include analog television signals, digital television signals, video tape signals, original programming signals, computer generated signals containing HTML content and digital video server signals. Also, input lines 22 can receive signals from digital video servers having hard discs or other digital storage media. Input signal adapters 36 preferably convert the input signals to a high quality analog format. The high quality analog signals are output by input signal adapters 36 to A/D converters 38. A/D converters 38 convert the analog signals received from input signal adapters 36 to digital signals, and compress the digital signals using MPEG2 encoding, although other compression schemes may be used.

During the MPEG2 encoding step, A/D converters 38 also perform a statistical multiplexing operation. During the statistical multiplexing operation, A/D converters 38 determine the amount of bandwidth that each channel will use. The amount of bandwidth allowed for each channel is determined based upon the content of the signal on that channel, and the amount of bandwidth used by other channels. For a program such as the motion picture "Independence Day", which has a very dynamic picture content with a great deal of movement and numerous bright explosions, the signal can not be compressed as much as a more static video signal like an information channel. The greater the dynamic content of the signal, the less it can be compressed and the greater the bandwidth required.

Typically, 30 Mega bits of data per second are transmitted by uplink dish 30 for each transponder in satellite 32. Each transponder receives and transmits data for about 6 channels. Thus, each channel occupies approximately 5 Mega bits of data per second, on average. During the statistical multiplexing operation, the amount of compression for each channel, and correspondingly the amount of information transmitted for each channel, is adjusted up or down depending upon the amount of available space for each transponder. Combiner 42 feeds back information to A/D converters 38 during the statistical multiplexing operation, informing A/D converters 38 of the amount of bandwidth used by various channels. A/D converters 38 then adjust the amount of compression of a signal based on the information fed back from combiner 42.

The MPEG2 encoded digital data are output by A/D converters 38 to combiner 42. Combiner 42 groups the MPEG2 encoded digital data from each A/D converter 38 into a plurality of packets, with each such packet marked with a service channel identification (SCID) number. The SCIDs are later used by receiver 64 (shown in FIG. 3) to identify the packets that correspond to each television channel. Combiner 42 combines all of the packets for all of the channels, adds error correction data, and outputs a single output data stream 28 to uplink dish 30.

Program transmitting system 44 processes audio signals in the same manner as video signals, and combiner 42 combines digital audio signals with the digital video signals. Combiner 42 also receives advertising and electronic program guide data from input lines 58 (as described below with respect to the advertisement program guide transmitting system 46) and adds that data to output data stream 28. The assembly and processing of the electronic program guide data prior to it being sent to combiner 42 is described in more detail below.

Output data stream 28, which is output by combiner 42, is a multiplexed signal that is modulated by combiner 42 using standard frequency and polarization modulation techniques. Output data stream 28 preferably includes 16 frequency bands, with each frequency band being either left polarized or right polarized. Because there are 32 transponders in the preferred embodiment, each of the 16 frequency bands are shared by two transponders. Therefore, transponder 1 is assigned frequency 1, left polarization; transponder 2 is assigned frequency 1, right polarization; transponder 3 is assigned frequency 2, left polarization, etc.

Also shown in FIG. 2 is a block diagram of advertisement and program guide transmitting system 46, which is a part of transmission station 26. Advertising and program guide data transmitting system 46 includes database 48, compiler 30, sub-databases 54A-54C (collectively referred to as sub-databases 54) and cyclers 56A-56C (collectively referred to as cyclers 56).

Schedule feeds 24 provide electronic schedule information about the timing and content of various television channels, such as that found in television schedules contained in newspapers and television guides. Schedule feeds 24 also provide HTML content. Advertising feeds 25 provide information describing various advertisements and provide the content for individual advertisements.

Database 48 is a computer-based system that receives data from schedule feeds 24 and advertising feeds 25 and organizes data into a standard format. Program guide data and HTML data may also be manually entered into program guide database 48 through data entry station 50. HTML data can be created with commercially available applications, including Claris software, Microsoft software and Adobe software. Compiler 52 reads the standard form data out of database 48, converts the data into the proper format for transmission to users (specifically, the data is converted into program guide and HTML objects as discussed below) and outputs the data to one or more of sub-databases 54. Compiler 52 includes a filter program for HTML data that makes sure that only the subset of HTML version 4.0 that is defined in receiver 64 (shown in FIG. 3) is used. The preferred subset of HTML version 4.0 defined in the receivers is discussed below. Alternatively, receiver 64 may be programmed to process the complete specification of HTML version 4.0, and no filter would be required.

The program guide, advertising and HTML objects are temporarily stored in sub-databases 54 until cyclers 56 request the information. Each of cyclers 56 preferably transmits objects to combiner 42 at a different rate than the other cyclers 56. For example, cycler 56A may transmit objects to combiner 42 every second, while cyclers 56B and 56C may transmit objects every 5 seconds and every 10 seconds, respectively.

Because receiver 64 (shown in FIG. 3) may not always be on and receiving and saving objects, the objects must be continuously retransmitted. Program guide objects for programs that will be shown in the next couple of hours are sent more frequently than program guide objects for programs that will be shown in 12 hours or more. Thus, the program guide objects for the most current programs are sent to a cycler 56 with a high rate of transmission, while program guide objects for later programs are sent to cyclers 56 with a lower rate of transmission.

All of the objects output by the plurality of cyclers 56 are combined by combiner 42. Combiner 42 combines the objects with the digital video and audio data output by A/D converters 38 on output lines 40. Combiner 42 transmits output data stream 28, which includes the advertising data, the program guide data, HTML data and the digital video and audio data, to uplink dish 30.

II. Format of Transmitted Program Guide and Advertising Data

Prior to transmitting data to sub-databases 54, compiler 52 organizes the program guide and advertising data from database 48 into objects. Each object preferably includes an object header and an object body. The object header identifies the object type, object ID and version number of the object. The object type identifies the type of the object. Various types of objects are discussed below. The object ID uniquely identifies the particular object from other objects of the same type. The version number of an object uniquely identifies the object from other objects of the same type and object ID. The object body includes data for constructing a portion of a program guide or an advertisement that is ultimately displayed on a user's television, and is also used for channel definition parameters.

Prior to transmission, each object is preferably broken down by compiler 52 into multiple frames. Each frame is made up of a plurality of 126 byte packets. Each frame includes a frame header, program guide data or advertising data and a checksum. Each frame header includes the same information as the object header described above—object type, object ID and version number. The frame header uniquely identifies the frame, and its position within a group of frames that make up an object. The checksum is examined by receiver 64 to verify the accuracy of the data within received frames.

The system described herein may use over 15 different object types. The objects that are used for providing channel definition parameters may include boot objects, channel list objects, channel objects and conditional objects. Advertising objects provide the characteristics of advertisements and point to other objects that contain the content of the advertisements. Other objects, such as HTML (Hyper Text Markup Language) objects, are used to provide channel and advertisement content. Still further objects, such as general program objects, general schedule objects and master schedule objects are used by receiver 64 to generate a display of a program guide on a user's television.

A boot object identifies the SCIDs where all other objects can be found. A boot object is always transmitted on the same channel, which means that each packet of data that makes up a boot object is marked with the same SCID number. Boot objects are transmitted frequently to ensure that receivers 64 that have been shut off, and are then turned back on, immediately receive information indicating the location of the various program guide objects. Thus, boot objects are sent from compiler 52 to a cycler 56 with a high rate of transmission.

III. Receiving and Processing Program Guide Data and Advertising Data

Figure 3:
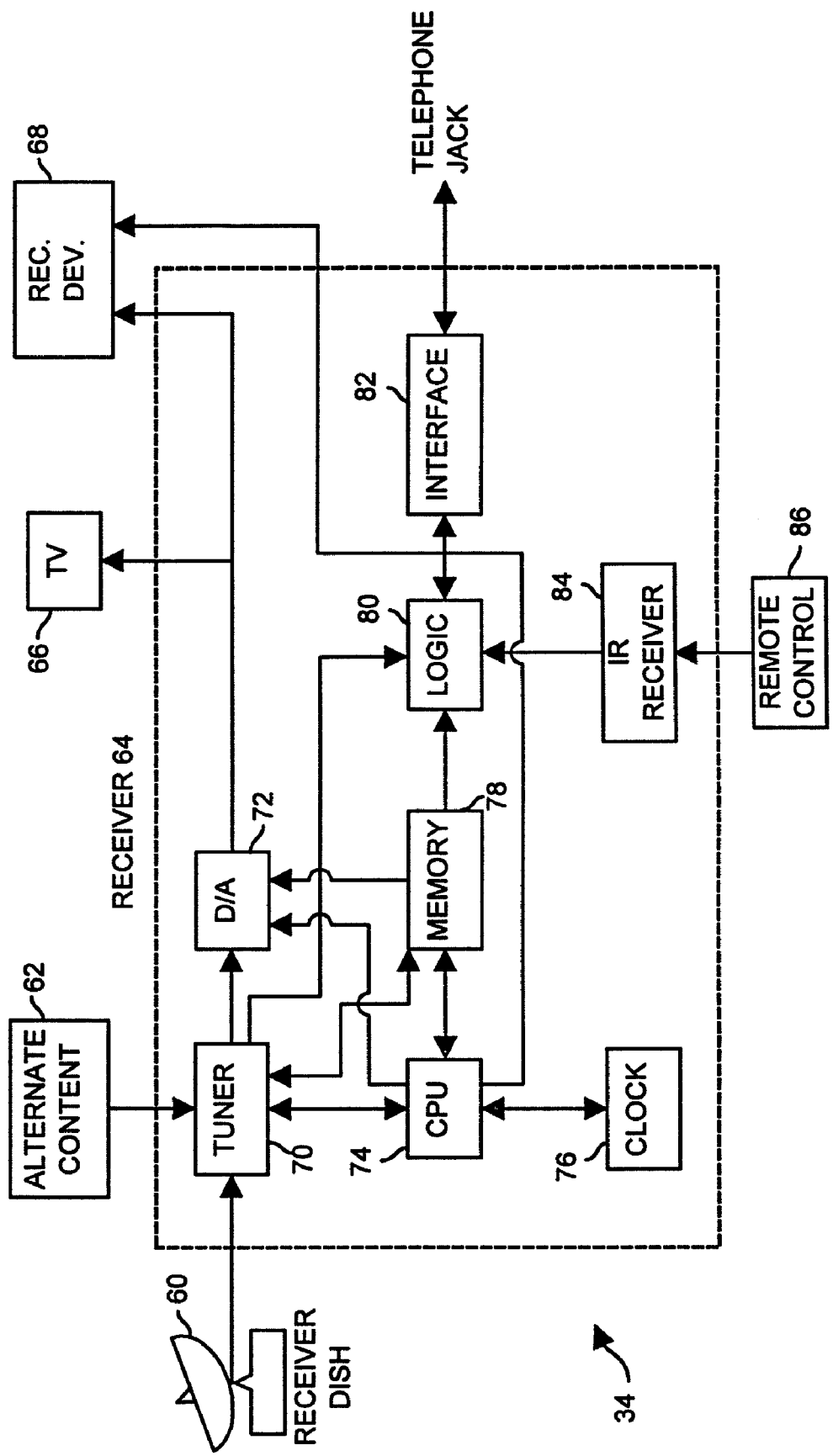
FIG. 3 is a block diagram of a receiver station for receiving and decoding audio, video and data signals.

FIG. 3 is a block diagram of one of the receiver stations 34, which receives and decodes audio, video and data signals. Receiver station 34 includes receiver dish 60, alternate content source 62, receiver 64, television 66, recording device 68 and remote control 86. Receiver 64 includes tuner 70, digital-to-analog (D/A) converter 72, CPU 74, clock 76, memory 78, logic circuit 80, interface 82, and infrared (IR) receiver 84.

Receiver dish 60 receives signals sent by satellite 32, amplifies the signals and passes the signals on to tuner 70. Tuner 70 operates under control of CPU 74. Tuner 70 is preferably two separate tuners, a first tuner for tuning to digital DSS and ATSC channels, and a second tuner for tuning to analog NTSC channels. The functions performed by CPU 74 are controlled by a control program stored in memory 78. Memory 78 also stores a parameter table, which includes a variety of parameters for receiver 64 such as a list of channels receiver 64 is authorized to process and generate displays for, the zip code and area code for the area in which receiver 64 is used, and the model number of receiver 64. Clock 76 provides the current local time to CPU 74. Interface 82 is preferably coupled to a telephone jack at the site of receiver station 34. Interface 82 allows receiver 64 to communicate with transmission station 26 via telephone lines. Interface 82 may also be used to transfer data to and from a network, such as the Internet.

The signals sent from receiver dish 60 to tuner 70 are digital signals that are grouped into a plurality of packets. Each packet includes a header that identifies the SCID number for the packet, and the type of data contained in the packet (e.g, audio data, video data, advertising data, or program guide data). Tuner 70 includes multiple output lines for transmitting video data, audio data, advertising data and program guide data. As packets are received from receiver dish 60, tuner 70 identifies the type of each packet and outputs each packet on the appropriate output line, as discussed in more detail below. If tuner 70 identifies a packet as program guide data or advertising data, tuner 70 outputs the packet to memory 78. Advertising data is stored in an advertising database in memory 78. Program guide data is stored in a guide database in memory 78.

In addition to the digital satellite signals received by receiver dish 60, other sources of television content are also preferably used. For example, alternate content source 62 provides additional television content to television 66. Alternate content source 62 is coupled to tuner 70. Alternate content source 62 can be an antenna for receiving off-the-air signals NTSC signals, a cable for receiving ATSC signals, or other content source. Although only one alternate content source 62 is shown, multiple sources can be used.

Initially, as data enters receiver 64, tuner 70 looks for a boot object. Boot objects are always transmitted with the same SCID, so tuner 70 knows that it must look for packets marked with that SCID. A boot object identifies the SCIDs where all other objects can be found. The information from the boot object is used by tuner 70 to identify packets of advertising data and program guide data and route them to memory 78.

As program guide data and advertising data are received and stored in the database in memory 78, CPU 74 performs various operations on the data in preparation for displaying a program guide or an advertisement on television 66. These operations include packet assembly, object assembly and object processing.

The first operation performed on the advertising and program guide data stored in the guide database in memory 78 is packet assembly. During the packet assembly operation, CPU 74 examines the stored advertising and program guide data and determines the locations of the packet boundaries.

The next step performed by CPU 74 is object assembly. During the object assembly step, CPU 74 combines packets to create object frames, and then combines the object frames to create program guide and advertising objects. CPU 74 examines the checksum transmitted within each object frame, and verifies whether the frame data was accurately received. If the object frame was not accurately received, it is discarded from memory 78. Also during the object assembly step, receiver 64 discards assembled objects that are of an object type that receiver 64 does not recognize. Receiver 64 maintains a list of known object types in memory 78. CPU 74 examines the object header of each received object to determine the object type. CPU 74 compares the object type of each received object to the list of known object types stored in memory 78. If the object type of an object is not found in the list of known object types, the object is discarded from memory 78.

The last step performed by CPU 74 on received program guide and advertising data is object processing. During the object processing step, the objects stored in the database are combined to create a digital image of a program guide. The objects stored in the database are also organized to create a digital image of an advertisement. The digital image of the program guide or advertisement is later converted to an analog signal that is sent to television 66 for display to a user.

IV. Processing Channel Objects

Users select a particular channel to watch on television 66 using remote control 86. Remote control 86 emits infrared signals that are received by infrared (IR) receiver 84 in receiver 64. Other types of data entry devices may alternatively be used, such as an ultra-high frequency (UHF) remote control, a keypad on receiver 64, a remote keyboard and a remote mouse. Channels are preferably selected using remote control 86 to navigate around an electronic television program guide, such as program guide 88 shown in FIG. 4, which is generated by receiver 64 and displayed on television 66. Channels may also be selected by entering a channel number with remote control 86.

Figure 4:
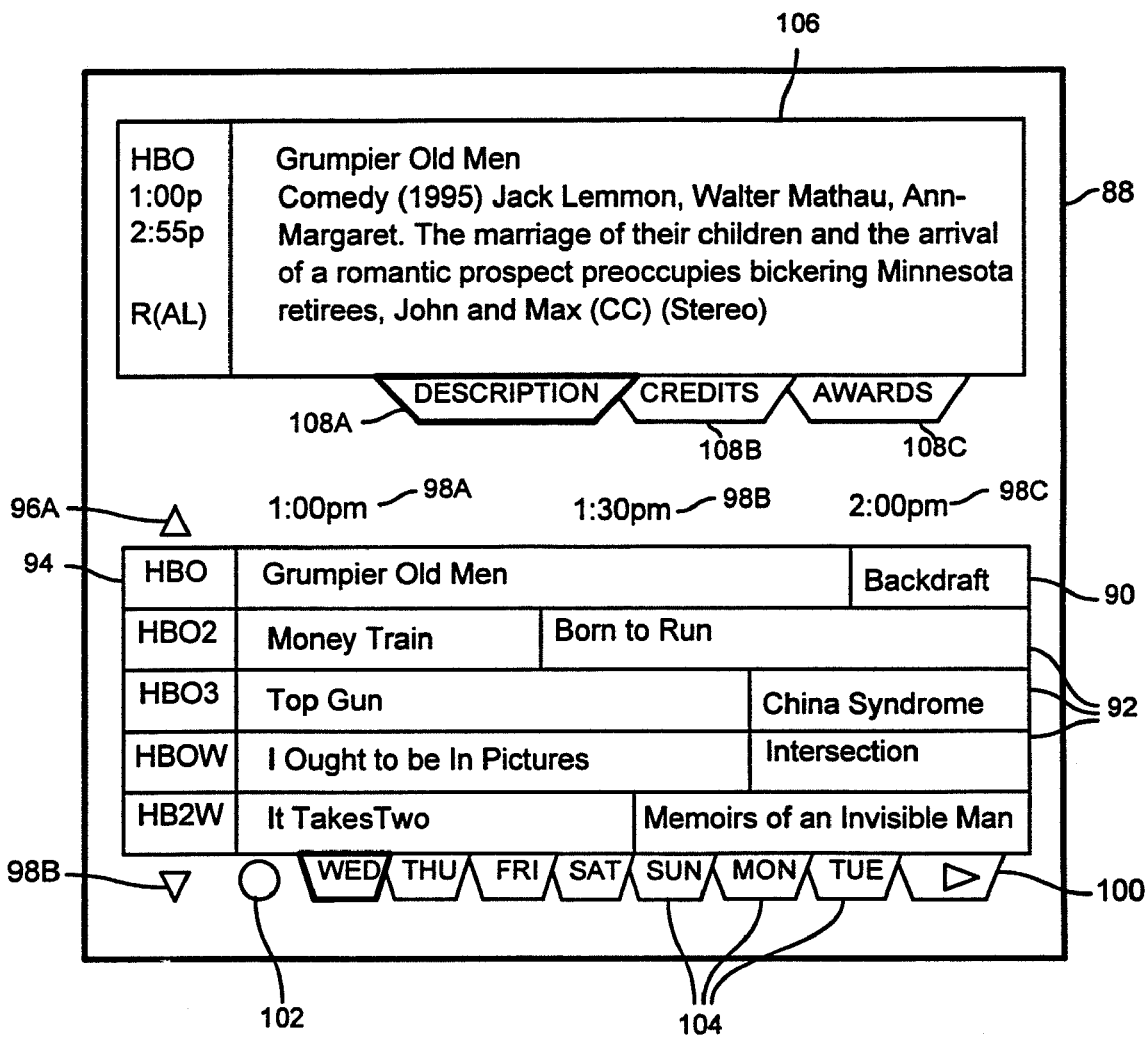
FIG. 4 is a diagram of a preferred embodiment of an electronic television program guide.

FIG. 4 is a diagram of electronic television program guide 88. Program guide 88 is displayed on a television, and provides information about the timing and content of various television programs. Program guide 88 may alternatively be displayed on other types of display devices, such as on a liquid crystal display (LCD) panel.

Program guide 88 includes grid 90, cells 92, channel list 94, scroll buttons 96A and 96B, time indicators 98A-98C (collectively referred to as time indicators 98), jump button 100, time button 102, day indicators 104, information window 106, and category buttons 108A, 108B and 108C (collectively referred to as category buttons 108). The various buttons and cells are highlighted by navigating around program guide 88 using remote control 86.

Grid 90 includes a plurality of cells 92. Each cell 92 includes a program title, and may provide additional information. Channel list 94 includes a list of channel names or channel numbers, or both. Channel list 94 may also include icons, such as icons that represent particular channels. The names and channel numbers for each entry in channel list 94 are obtained from the channel object for that entry. Time indicators 98A, 98B and 98C (referred to collectively as "time indicators 98") indicate start and end times of the various programs displayed in grid 90. Although half-hour time blocks (a time block is the length of time between two time indicators 98) are shown in program guide 88, other time block lengths may be used. Scroll buttons 96A and 96B allow users to scroll up and down channel list 94 and display different channels. Day indicators 104 indicate the day for which program information is presently being displayed. In FIG. 4, day indicators 104 indicate that the displayed guide information is for Wednesday. Jump button 100 allows users to skip to program information for a different day than that presently displayed. Time button 102 allows users to skip to program information for a different time than that presently displayed.

Information window 106 provides additional information about programs displayed in grid 90. The type of information displayed in information window 106 depends on which category button 108A-108C is currently selected. Users select one of category buttons 108A-108C using remote control 86. As shown in FIG. 5, the "Description" category is selected. Therefore, when a particular program is selected from grid 90 by remote control 86, a description of that program is displayed in information window 106. In FIG. 4, the program "Grumpier Old Men" was selected from grid 90, so a description of that program is displayed in information window 106. Similarly, if category button 108B or 108C were selected, credits information or awards information, respectively, for "Grumpier Old Men" would be displayed in information window 106. Other types of category buttons 108 may also be used to display additional categories of information.

Program guide 88 preferably includes schedule information for numerous channels, including DSS channels, ATSC channels and NTSC channels, regardless of whether the channel content is actually transmitted by television broadcasting system 20. For instance, the embodiment shown in FIG. 4 includes television content generated by alternate content source 62. Program guide 88 preferably includes schedule information for the television content generated by alternate content source 62.

V. Displaying Advertisements

Advertisements include trademark images, product images, text, or video, alone, or in combination, and can include accompanying audio. Traditionally, advertisements have been part of television content as it is being broadcast. Each television receiver displayed whatever advertisements happen to be broadcast to it in conjunction with the television programs selected for display. Once the television content and advertisements were broadcast to a receiver, there was virtually no intelligence or flexibility with regard to which advertisements are displayed to a television broadcast service user, or when and how those advertisements are displayed to the user.

The present invention provides a system for intelligently and flexibly displaying advertisements. According to the present invention each receiving station will display advertisements that other receiving stations will not necessarily display. In addition, each user of a particular receiver may not see the same advertisements as another user of the same receiver. Television content, program guide data and advertising data are broadcast to receiving stations as described above, receiver 64 monitors both which television programs are selected by a user and which advertisements it has received to tailor which of the received advertisements will be displayed to a user of receiver 64, in addition to how and when the advertisements chosen by receiver 64 will be displayed.

The advertisement display system includes three parts. The first part involves building a database of information regarding what viewing selections an individual user makes. Here, receiver 64 compiles information about the user's viewing history and uses that information to intelligently display advertisements to the user. Receiver 64 preferably tracks the user's viewing history and stores this information in a selection history table in memory 78. The selection history table is initially empty when receiver 64 is first purchased. For each program that is chosen by a user, receiver 64 stores information characterizing the program. The characterizing information is included in the program guide objects broadcast to the receiver as discussed above. When a user selects a program from program guide 88, the characterizing information from the associated program guide object is stored in the selection history table in memory 78.

The characterizing information may be organized into attributes. Attributes include information such as category descriptors that identify the type and category of program, name descriptors that identify the name of the program selected, credits information that identify the names and roles of those involved in the production of the program, and key words and phrases in the description of the program. Category descriptors preferably provide a two-tiered category classification, such as "sports/baseball" or "movie/drama," although any number of tiers may be used including single tiers.

Attributes also include indicators that the program is one of a particular series or that the program is one of a group of associated programs. For example, each episode of "Star Trek, The Next Generation" will have the same series indicator. The "Star Trek" movies, and various "Star Trek" series will all have the same group indicator, even if they are not part of one particular series. CPU 74 keeps track of the program selections made by users, stores the attributes for selected programs in the selection history table and links the attributes to the current user.

In compiling a selection history table, receiver 64 preferably filters out programs the user has selected, but viewed for an insignificant time period. CPU 74 of receiver 64 preferably keeps track of the amount of time each program is watched using clock 76 and stores the times in the selection history table. If programs and channels are watched for a time more than a set threshold, 12 hours for example, the attributes for those channels and programs are not stored in the selection history table. If programs are watched for a time that is less than a set threshold, such as 30 seconds, the attributes for those programs are not stored in the selection history table. In this way, programs the user selects when "channel surfing," or programs displayed when the user has forgotten to turn off the receiver are filtered out of the selection history table stored in memory 78.

In addition, in compiling a selection history table, receiver 64 preferably tracks a plurality of individual users' viewing preferences. When receiver 64 is first turned on, or after receiver 64 has not been interacted with for a predetermined time, receiver 64 prompts the user to identify himself or herself. FIG. 5 shows identification screen 110 which is one example of a screen receiver 64 displays to prompt the users's identification. The identification screen displays a set of descriptions 112A-112D which enable the user to correctly identify himself or herself. Although FIG. 5 shows descriptions 112A-112D as being traditional family roles, descriptions can be identification numbers, names, initials, or other identifying information. The user highlights and enters one of descriptions 112A-112D using remote control 86, thereby identifying himself or herself.

When a user enters one of descriptions 112A-112D with remote control 86, a user identification signal is sent to receiver 64. Receiver 64 receives the user identification signal, identifies the user and stores the attributes associated with that user's channel and program selections in a user-specific sub-history within the selection history table. Receiver 64 uses the selections made by each of the plurality of identified users to create and update the list of attributes linked with that user. In this way, the flexible advertising targeting techniques of the present invention can be specific to one of a plurality of users of one receiver 64.

As discussed earlier, advertisements are broadcast to receiver 64 along with television content and program guide data. Each advertisement comprises an advertising object which includes attributes associated with the advertisement and which points to other objects which contain content to assemble the advertisement for display. Receiver 64 determines how well a particular advertisement fits the individual user by comparing the attributes associated with the related advertising object with the attributes stored in the selection history table that are linked to the individual user's viewing history. Receiver 64 then determines which advertisements are assembled and displayed to the user, and when and how those advertisements are displayed to the user.

An example of a static advertisement displayed in program guide 88 is shown in FIG. 6. In this example, advertisements 114A and 114B are static images of corporate trademarks or logos. Here, receiver 64 has simply assembled and displayed the images in program guide 88. Although the description that follows focuses on displaying advertisements along with program guide 88, the techniques of this invention apply equally to the assembly and display of advertisements along with television programs, or along with other content receiver 64 displays to a user. In addition, although static images are shown in this example, advertisements can include video images and accompanying audio.

Figure 7:
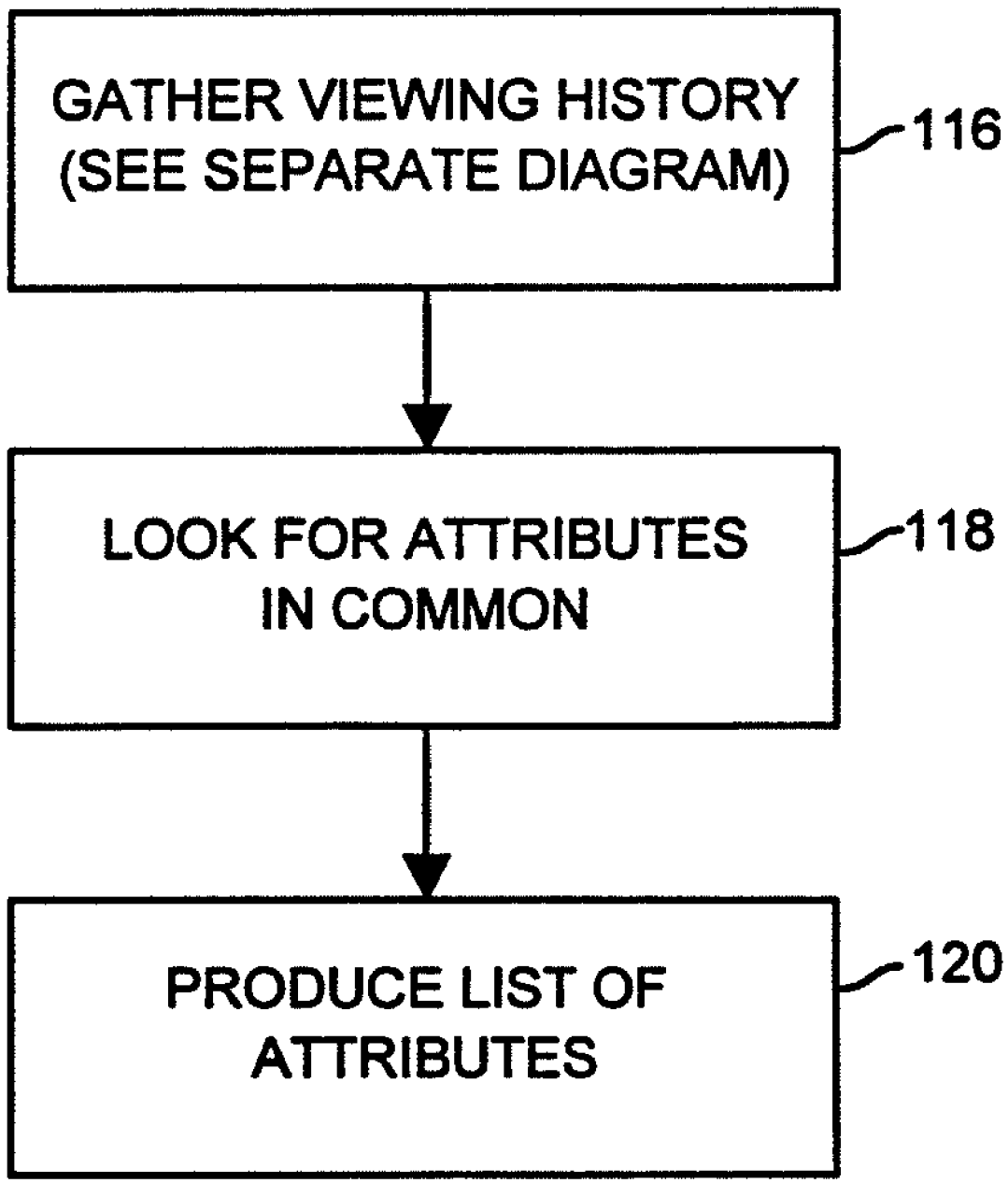
FIG. 7 is a block diagram illustrating similarity matching.
Figure 8:
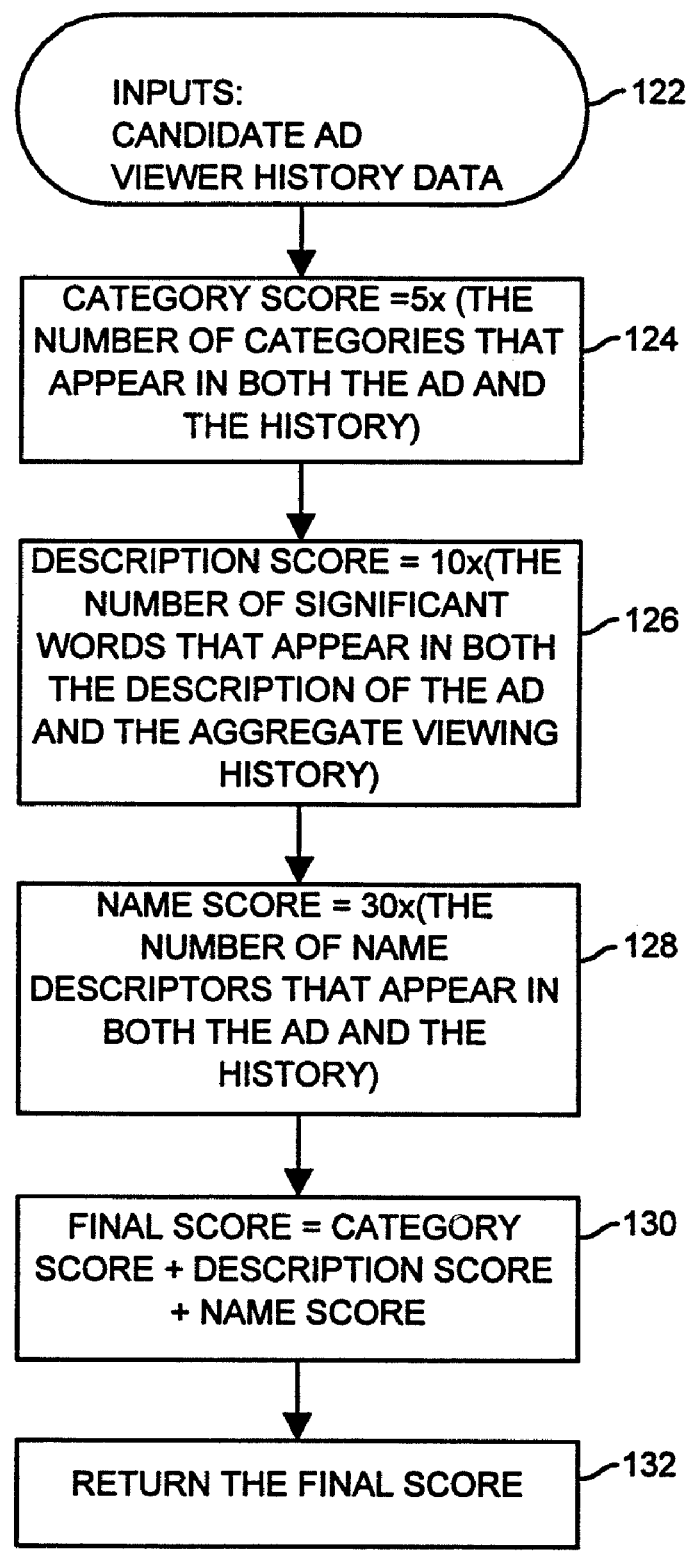
FIG. 8 is a block diagram illustrating how advertisements are compared to a user's selection history.
Figure 9:
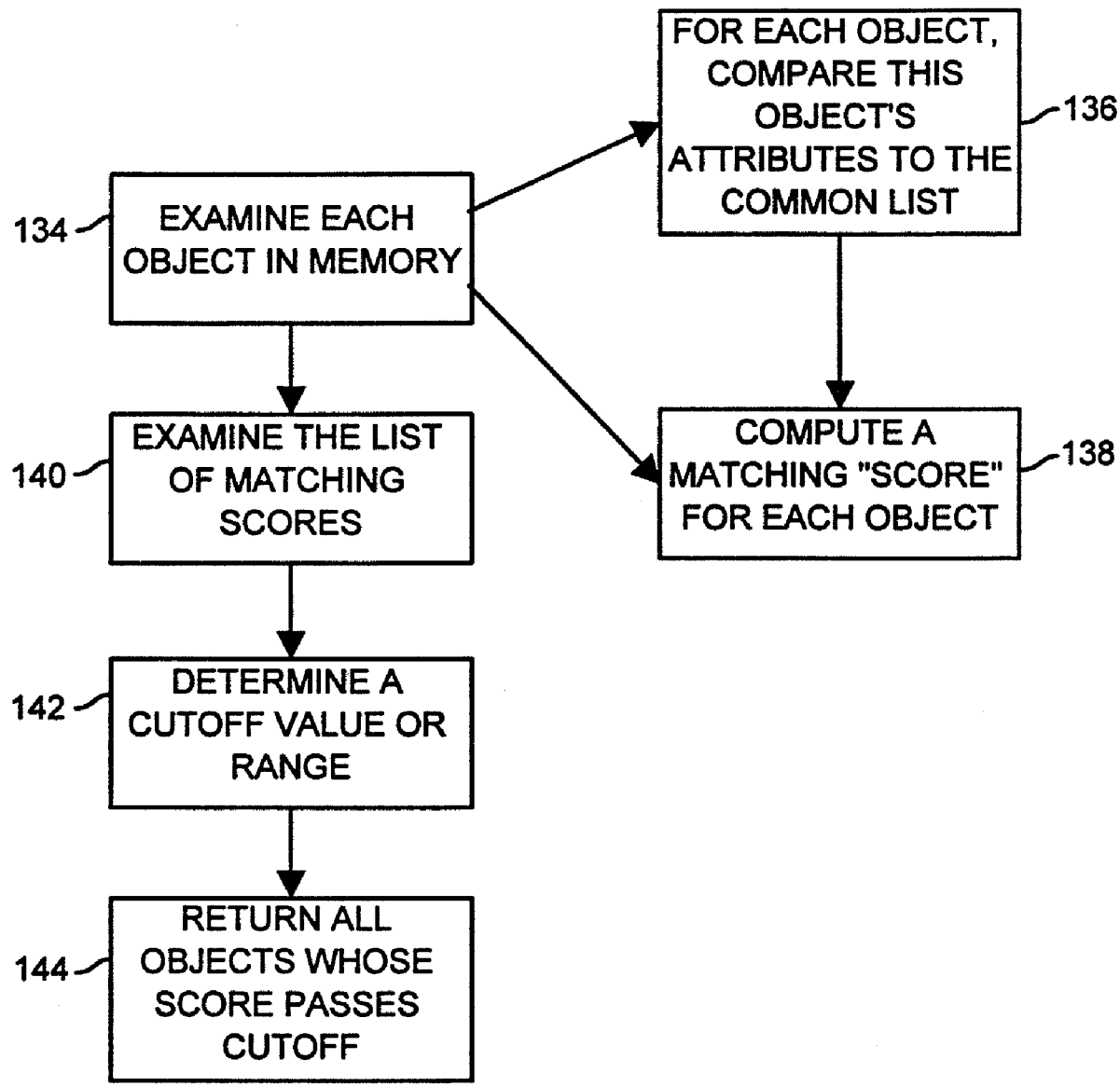
FIG. 9 is a block diagram illustrating an example of a similarity algorithm a receiver uses to perform similarity matching shown in FIGS. 7 & 8.

The second part of the advertising system involves correlating the characteristics of transmitted advertisements with the information compiled regarding individual users' viewing selections. Receiver 64 uses similarity matching to determine how well advertisements fit the information compiled and stored in the selection history table. FIGS. 7-9 are block diagrams illustrating similarity matching. As shown in FIG. 7, CPU 74 in receiver 64 accesses the selection history table stored in memory 78 for the selection history of the user (Block 116). CPU 74 identifies attributes that are common among the stored selections in the selection history table (Block 118). As mentioned earlier, attributes include information from category descriptors, name descriptors, credits information, and key words or phrases discussed earlier. From the attributes that are common among the stored selections, CPU 74 generates a list of common attributes associated with the user (Block 120). This list of common attributes is a viewing profile that the receiver 64 uses to intelligently assemble and display advertisements.

Receiver 64 uses a similarity algorithm to compare advertisements to the individual user's viewing preferences as described by the list of common attributes stored in the selection history table. The similarity algorithm used can weight certain attributes in order to calculate a similarity score tailored to a user in specific ways. The amount of weight given to a particular attribute (e.g., name descriptor) effects the relative similarity scores for the advertising objects, and therefore ultimately the priority in which these advertisements are displayed to the user.

For example, a fast food chain may tie certain items it serves to a movie or television program. The fast food chain advertisement that markets the tie-in may have an associated name descriptor that includes the name of the tied movie or television program. If the user has selected the tied movie or television program, the similarity algorithm which heavily weights the name descriptor attribute relative to the other attributes will insure that the fast food advertisement has a relatively high similarity score even though other attributes associated with the advertisement may not match the list of common attributes in the user's selection history. In this way, the user is likely to see advertisements tied to the programs the user has selected, regardless of how few of the advertisement's other associated attributes match the list of common attributes from the user's selection history table. Other similarity algorithms may be used to emphasize other attributes by weighting those attributes to further tailor advertisements to the user in other ways.

The example similarity algorithm explained below in reference to FIG. 8 emphasizes the name descriptor attribute by weighting it three and six times as much as the other attributes examined. In addition, the example similarity algorithm is also set up to scale similarity scores so that advertisements that match well to a user have a score between 100 and 150. Using this algorithm, a similarity score of 100 is used as a predetermined reference score to compare the relative similarity scores of advertisements. As explained later, receiver 64 uses a predetermined score to determine what, when and how to display advertisements to an individual user. The present invention is not limited to any one particular similarity algorithm. Numerous other algorithms may be used to correlate the attributes of a user's selection history and the attributes of broadcast advertisements.

According to the example similarity algorithm illustrated in FIG. 8, CPU 74 examines the associated advertising object for an advertisement and the list of common attributes for the selection history table stored in memory 78 for matching attributes (Block 122). Next, CPU 74 counts the number of attributes common to both the user selection history and the advertisement to calculate a final score (Block 130).

CPU 74 examines the advertisement and the selection history for category descriptors common to both the advertisement and the selection history and calculates a category score (Block 124). CPU 74 counts the number of category descriptors common to both the selection history table and the advertisement and weights the count by multiplying the count by five.

Next, CPU 74 examines the advertisement and the selection history for words common to the description fields of both the advertisement and the selection history table and calculates a description score (Block 126). CPU 74 filters out less significant words such as "and", "is" and "the" in order to determine a more meaningful description score. CPU 74 counts the number of significant words common to both the selection history table and the advertisement and weights that number by multiplying the count by ten.

Next, CPU 74 calculates a name score by examining the name descriptors in both the advertisement and the selection history table (Block 128). CPU 74 counts the number of name descriptors common to both the selection history table and the advertisement. CPU 74 weights the count by multiplying the count by thirty.

Finally, CPU 74 calculates the similarity score for the advertisement by adding the category score, the description score, and the name score together (Block 130). The calculated score for that advertisement is stored in memory 78 (Block 132) so that CPU 74 can compare the newly calculated similarity score with similarity scores for other advertisements, and later use the calculated similarity score to determine when and how to display the advertisement.

The third part of the advertising system involves using correlations between the characteristics of advertisements and the compiled selection history to display advertisements in an individualized manner suited to each individual user. One example of receiver 64 using similarity scores to match advertisements to an individual user's preferences is to only display those advertisements which have at least a predetermined cutoff similarity score. As shown in FIG. 9, receiver 64 uses a similarity matching technique to determine which advertisements are displayed to the user. CPU 74 examines each advertising object stored in memory 78 for the attributes associated with each advertising object (Block 134). CPU 74 compares the set of attributes associated with each advertisement to the list of common attributes for the user generated during similarity matching (Block 136). Using a similarity algorithm such as the example discussed in detail in reference to FIG. 8, CPU 74 generates a similarity score for each advertising object examined (Block 138). Receiver 64 examines the list of matching scores (Block 140) and determines a cutoff similarity score for the advertisements currently in memory 78 (Block 142). Only those advertisements with advertising objects that have a similarity score above the determined cutoff score or range are retained in memory 78 (Block 144) and shown to the individual user.

Figure 10:
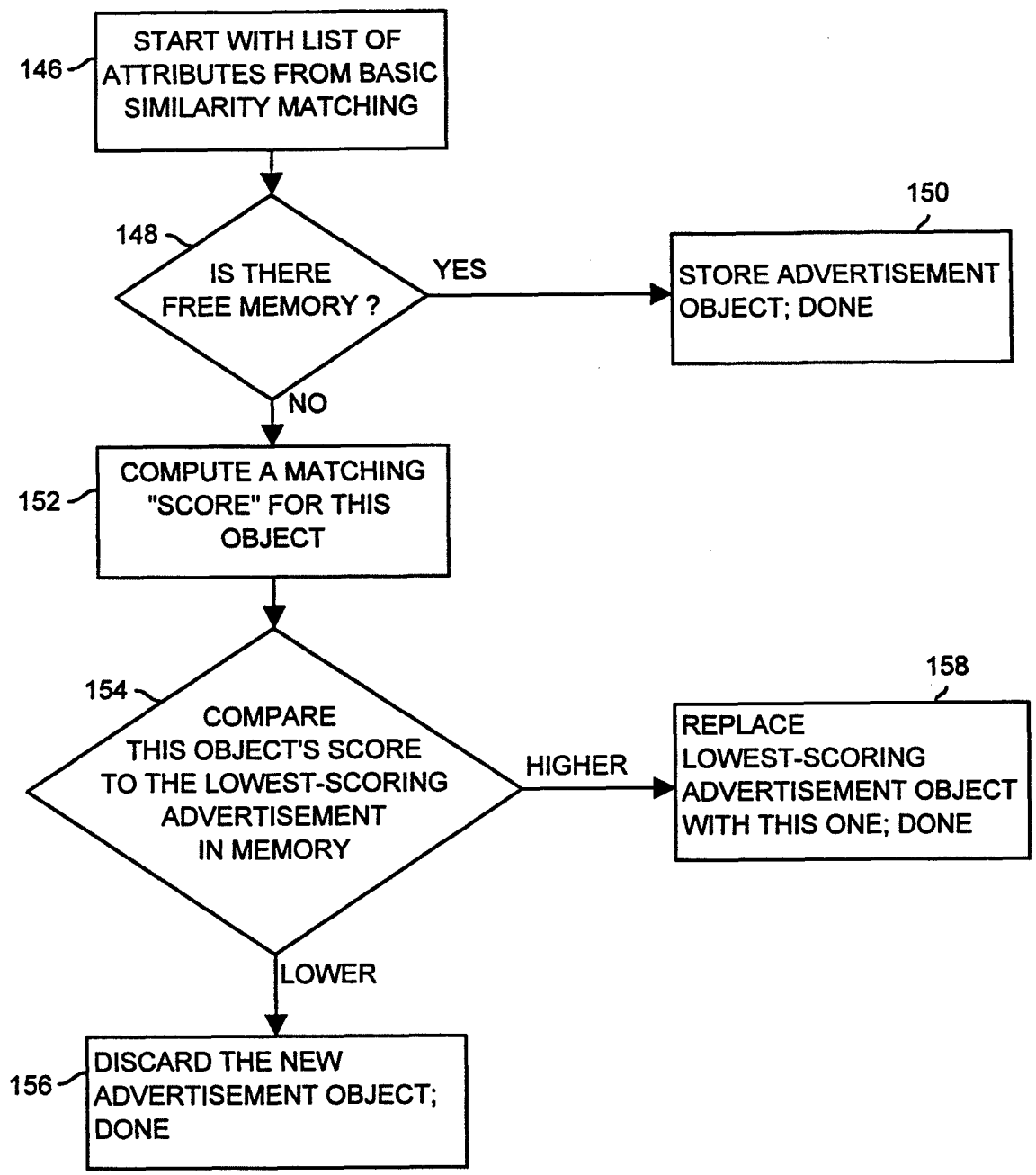
FIG. 10 is a block diagram illustrating how a receiver enhances the use of memory using similarity matching.

Another similar example of how similarity scores are used is illustrated in FIG. 10. Receiver 64 enhances its use of memory 78 and tailors advertisements to the user according to FIG. 10. A pool of advertisements in memory 78 is created and continually updated with advertisements which have similarity scores higher than those advertisements currently in memory. The finite storage space in memory 78 is enhanced by preferentially storing those advertisements which have relatively high similarity scores.

Receiver 64 starts with the list of common attributes from the selection history table for a user as discussed earlier in reference to FIG. 7 (Block 146). As new advertising objects are received and stored by receiver 64, CPU 74 determines whether there is sufficient free space in memory to store the associated advertisements (Block 148). If CPU 74 determines there is free space in memory 78, CPU 74 stores a newly received advertising object and the additional objects required to assemble and display the advertisement in memory 78 (Block 150). If CPU 74 determines that memory 78 has insufficient free space to store the incoming advertising object, CPU 74 compares the newly received advertising object's set of attributes to the list of common attributes from the selection history table in memory 78 and generates a similarity score for the newly received advertising object (Block 152).

CPU 74 compares the similarity score for the newly received advertising object to the lowest similarity score associated with the advertising object among the advertisements already stored in memory 78 (Block 154). If the newly received advertisement's score is lower than the lowest similarity score currently in memory 78, CPU 74 does not save the newly received advertisement in memory (Block 156). If the newly received advertisement's score is higher than the lowest similarity score currently in memory, CPU 74 replaces the advertising object with the lowest similarity score and its associated advertisement with the newly received advertising object and its associated advertisement (Block 158). In this way, receiver 64 assembles and displays advertisements drawn from a pool of advertisements in memory 78 that most closely matches the user's preferences. In addition, the finite space in memory 78 is occupied only by those advertisements that have relatively high similarity scores.

As mentioned earlier, according to the present invention, receiver 64 not only determines which advertisements to display, but also how and when to display the chosen advertisements according to how advertisements fit a user's selection history. For example, an advertising object having a high similarity score would be shown before an advertisement having a low similarity score. Also, an advertisement having a high similarity score would be shown more frequently and prominently on the display screen. In this way, users of the present invention see advertising customized to their interests and advertisements more likely meet an interested audience.

Figure 11:
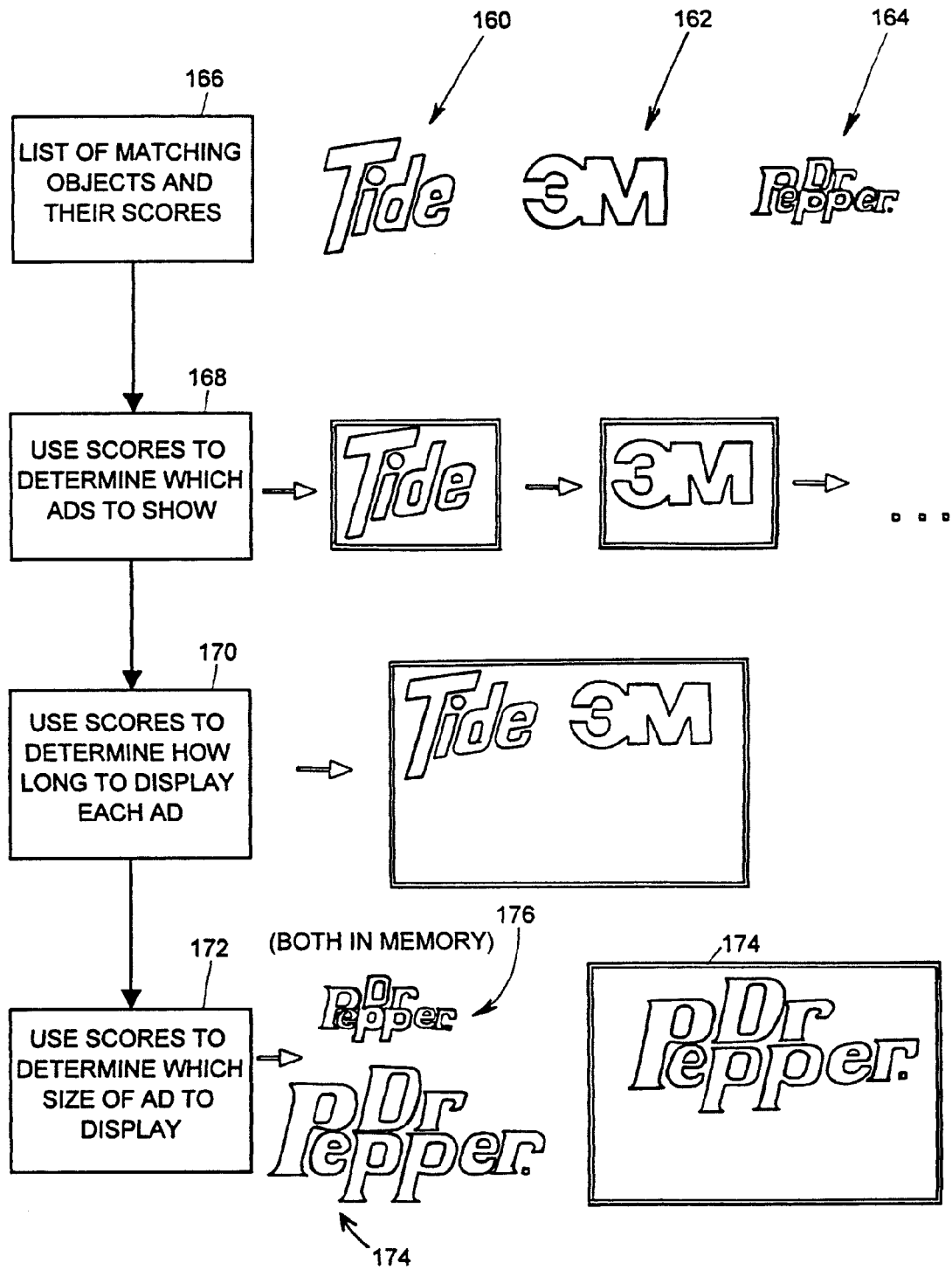
FIG. 11 is a diagram illustrating the use of similarity matching to prioritize the display of advertisements.

FIG. 11 shows examples of how the version and timing of displayed advertisements being varied according to a user's preferences. For illustrative purposes, receiver 64 has three advertisements to work with: laundry detergent advertisement 160, corporate advertisement 162, and soft drink advertisement 164. Receiver 64 begins with a set of advertisements and their associated advertising objects and their corresponding similarity scores stored in memory 78 (Block 166).

Receiver 64 uses the similarity scores for the set of advertisements to determine which advertisements to display (Block 168). For example, if of the three example advertisements, only the laundry detergent advertisement 160 and the corporate advertisement 162 have similarity scores above a predetermined threshold similarity score, only these two advertisements are displayed. On the other hand, soft drink advertisement 164 is not displayed if its associated similarity score was not at or above the similarity score threshold.

Similarly, receiver 64 uses the similarity scores for the set of advertisements to determine the priority and length of time for displaying the advertisements (Block 170). If, as in this example, the laundry detergent advertisement 160 has the highest similarity score, laundry detergent advertisement 160 is displayed before the corporate advertisement 162 and so on. In this way, the laundry detergent advertisement is most likely to be seen before the user selects a channel or turns receiver 64 off.

Alternative versions of the same advertisement are displayed according to the user's viewing preferences in the present invention. For example, each of the plurality of advertising objects stored in memory 78 can point to a plurality of different images (e.g., a different size, or a different graphic) for the advertisement. Receiver 64 uses the similarity score for each advertisement and determines which advertising image to display based on the similarity score for that advertising object (Block 172). For example, if CPU 74 determines soft drink advertisement 164 has a similarity score greater than a threshold similarity score, receiver 64 assembles and displays larger image 174 rather than smaller image 176 for soft drink advertisement.

Receiver 64 can use similarity scores in alternative ways to determine the image and timing of advertisements. For example, receiver 64 may simply compare the similarity scores of the advertisements currently in memory 78 and display the larger image of those advertisements which have a similarity score a predetermined percentage higher than the average similarity score for all of the advertisements currently stored in memory 78. By using the same techniques, receiver 64 also determines how long and how often to display a particular advertisement according to the similarity score of the associated advertising object for that advertisement.

Another technique for intelligently displaying advertisements according to the present invention is selective retention of advertisements. Receiver 64 retains advertisements that are interesting to an individual user so that the user can later view or interact with the retained advertisements. Each advertisement may have a predetermined viewing lifetime. The viewing lifetime data broadcast as part of the advertising object for that advertisement. CPU 74 uses the advertising lifetime to determine when and how long to display the associated advertisement. For example, an advertising object containing the data for assembling an advertisement for a newly introduced automobile may have a two month viewing lifetime from the date the automobile first becomes available to consumers. With the present invention, advertisements are retained beyond the predetermined viewing lifetime by receiver 64, if receiver 64 determines that the advertisement has at least a predetermined threshold similarity score. In this way, users are less likely to miss an opportunity to view or respond to interesting advertisements.

Figure 12:
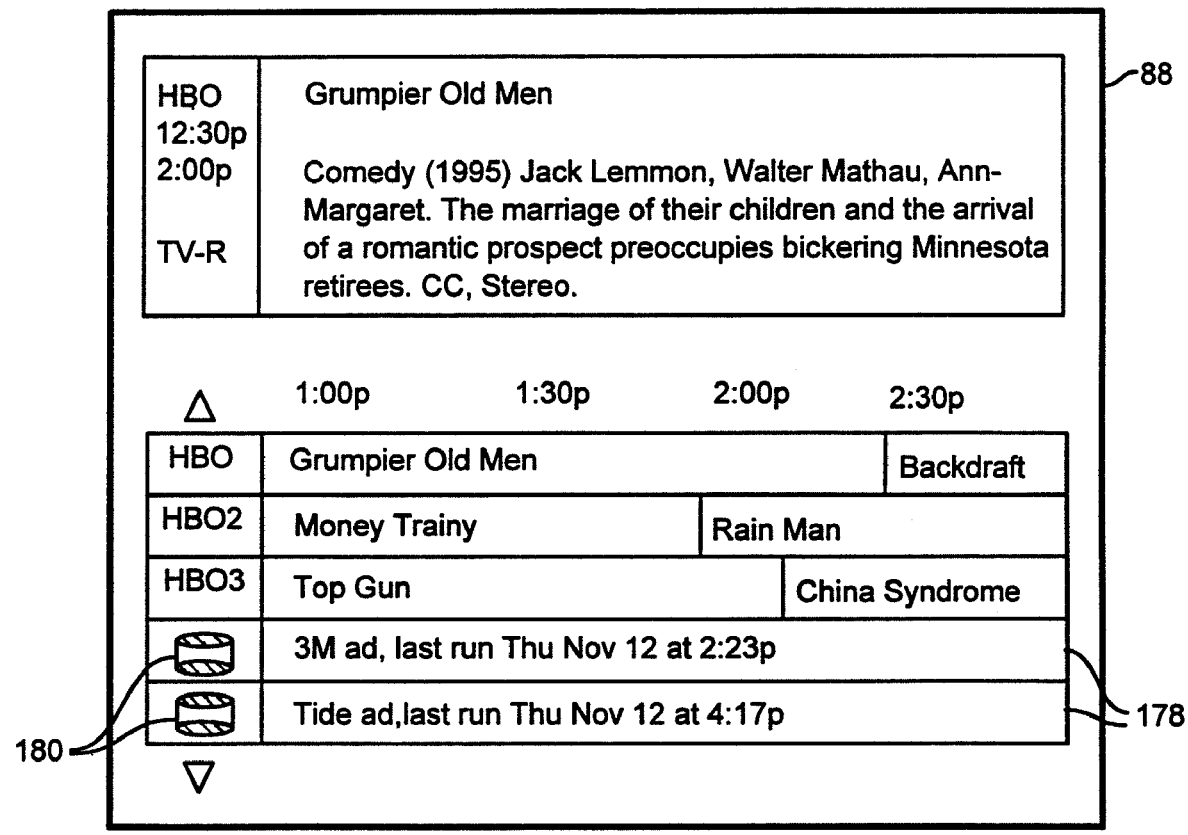
FIG. 12 is a diagram of a program guide displaying records of retained advertisements.

An example of this is shown in FIG. 12. Program guide 88 includes records 178 of advertisements that receiver 64 has identified for retention. Receiver 64 identifies advertisements for retention according to their similarity scores. Receiver 64 retains those advertisements that have a similarity score higher than a predetermined score. Records 178 of past advertisements are indicated by icons 180. Icons 180 have a disk shape to show that the advertisement has been retained in memory 78. Icons 180 may take other forms such as text including the product advertised, or reduced images of the advertisement itself. Because the advertisement has been retained after the receiver has finished displaying an advertisement, the user can still select record 178 to view the advertisement and request more information. In this way, a user can view and act in response to interesting advertisements at the user's own pace. As a result, the user is less likely to miss an opportunity to interact with or view an interesting advertisement.

Another aspect of intelligently displaying advertisements according to the present invention includes the ability of the user to interact with displayed advertisements. User interaction includes manipulating the display of advertisements, and the user requesting more information, or making purchases, in response to an advertisement. In addition, statistical data concerning which advertisements are shown is kept according to the present invention. The statistical data enables a broadcast service provider to collect information related to the advertisements it broadcasts.

Figure 13A:
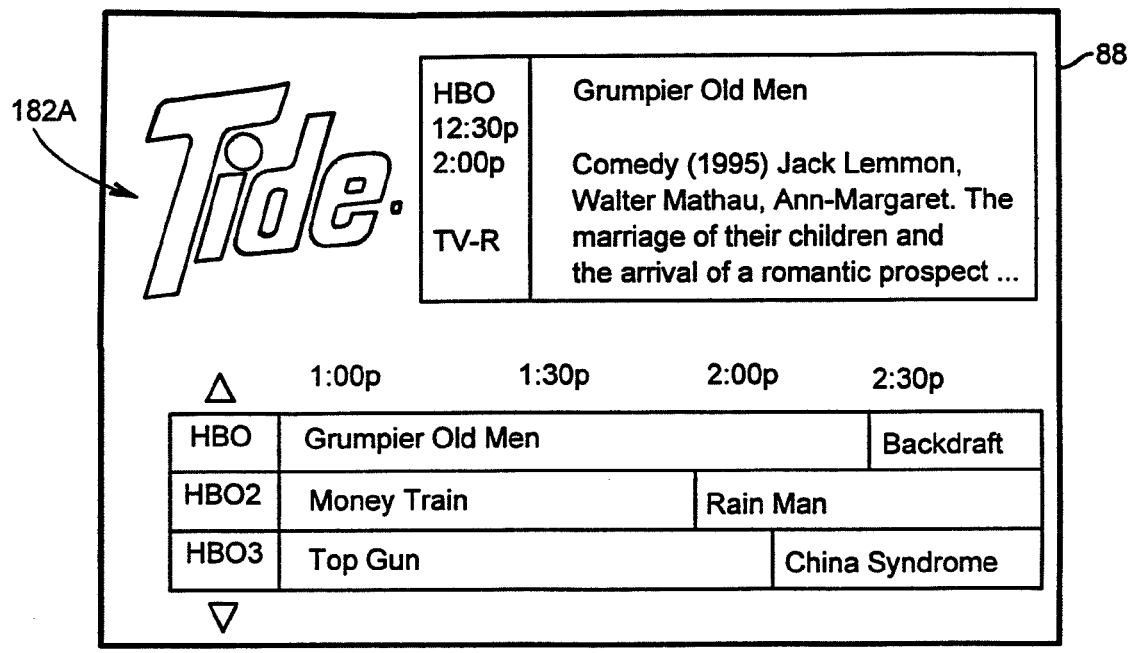
FIGS. 13A-13C are diagrams showing examples of how a user controls the display of an advertisement in the program guide.
Figure 13B:
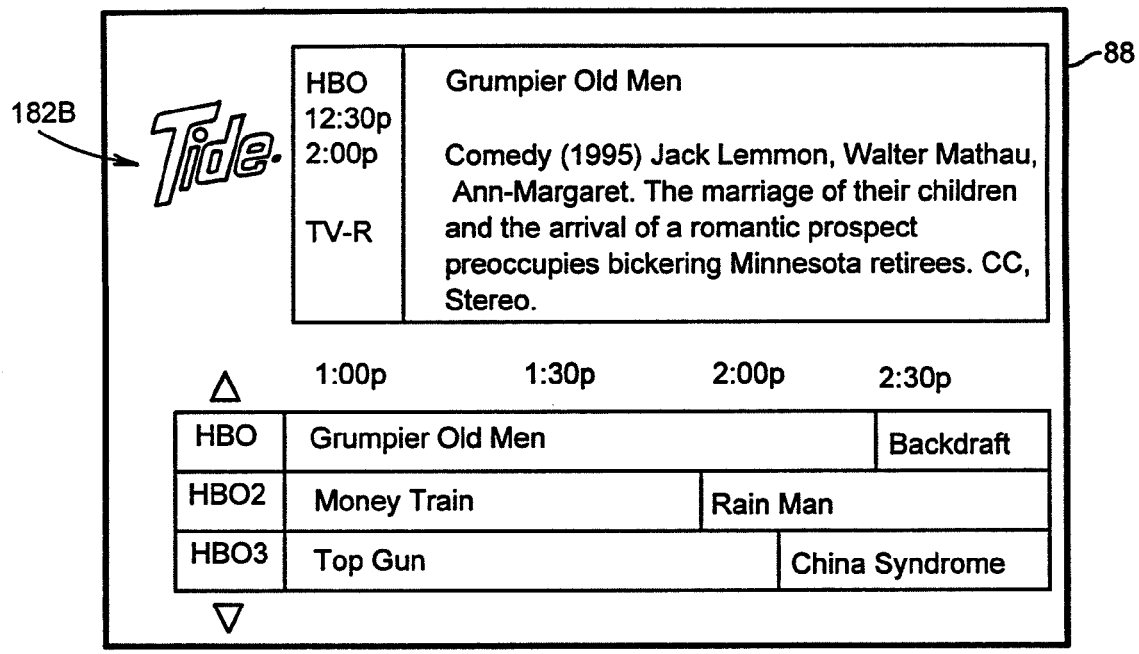
Figure 13C:
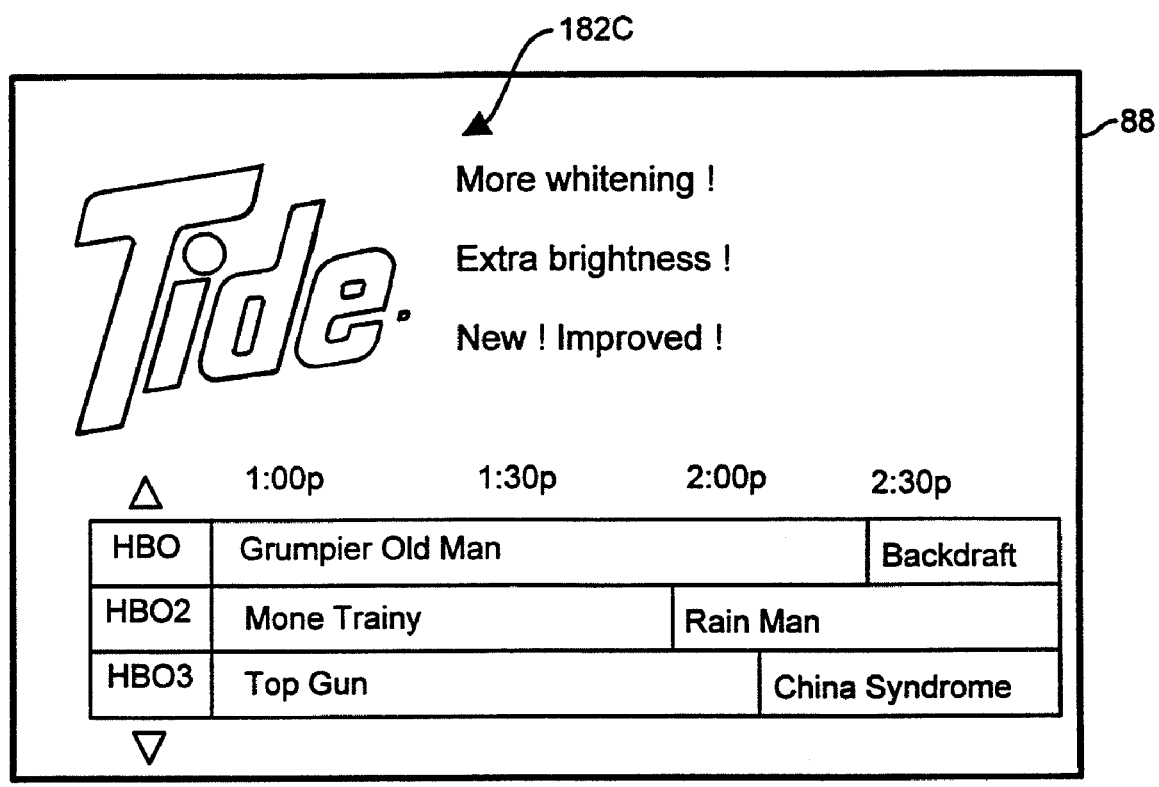

One example of a user-manipulation of displayed advertisements is illustrated in FIGS. 13A-13C. In this example, three advertisement images 182A-182C are available for one laundry detergent advertisement. FIG. 13A shows initial advertisement image 182A for a laundry detergent advertisement. FIG. 13B shows small image 182B for the same advertisement. FIG. 13C shows large image 182C of the same advertisement. Here, large image 182C shown in FIG. 13C includes additional advertising information.

Figure 14:
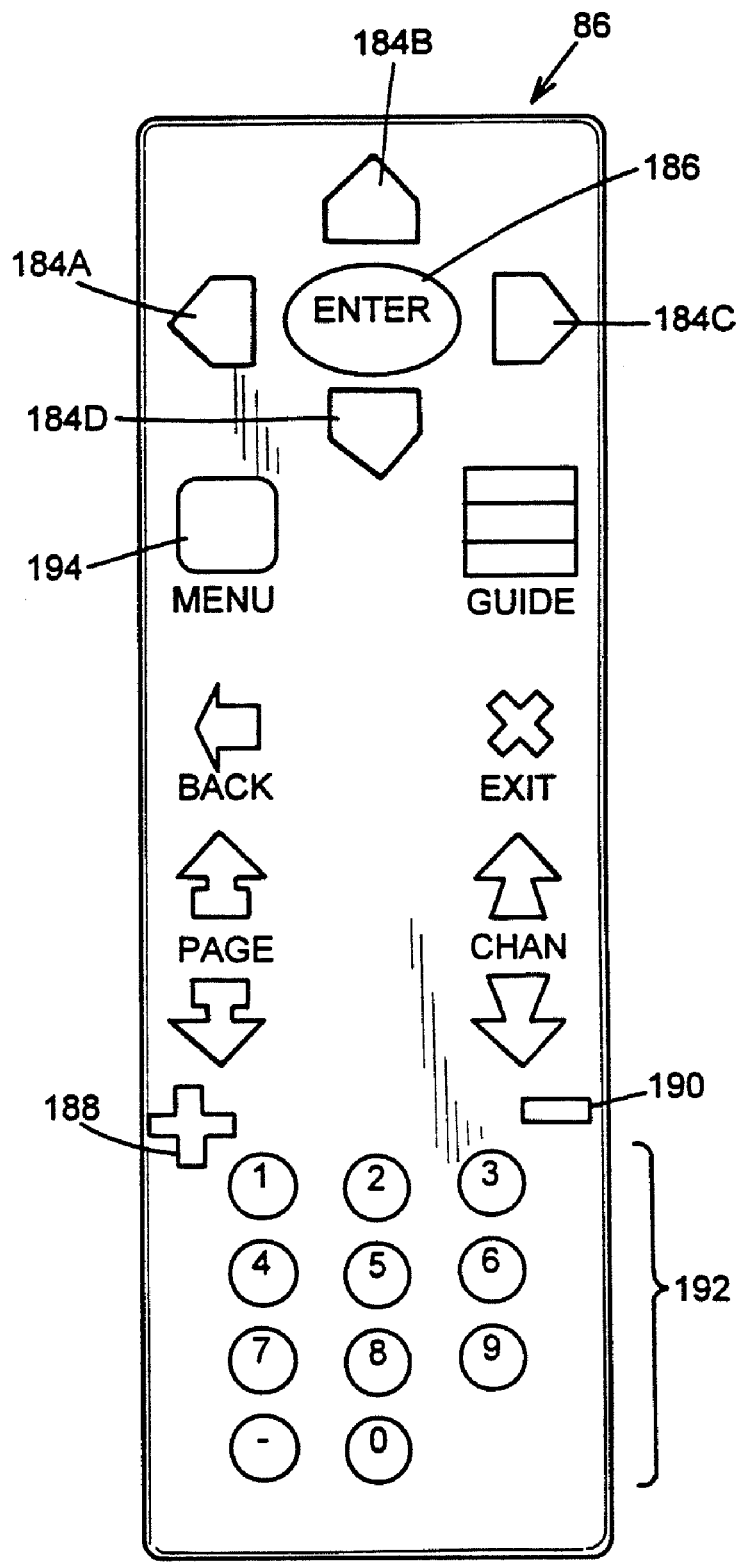
FIG. 14 is a diagram of an embodiment of a remote control.

The user controls which image he sees by selecting the advertisement using remote control 86. Remote control 86 may have an array of buttons which allow the user to send an image altering signal to receiver 64. FIG. 14 shows an example of these features on remote control 86. Remote control 86 includes navigation buttons 184A-184D, enter button 186, maximize button 188, minimize button 190 and number pad 192. Once the user has highlighted a particular advertisement by pressing the navigation buttons 184A-184D to position a highlight bar over the displayed advertisement image, the user can enlarge or diminish the advertisement that the image receiver 64 is currently displaying by pushing maximize button 188 or minimize button 190. Users can signal the receiver with other input devices such as a keyboard or mouse in place of remote control 86. Remote control 86 also includes menu button 194 which allows the user to call-up a menu screen which is discussed in reference to FIGS. 15-18 below.

When the user selects initial image 182A (FIG. 13A) of a displayed advertisement and presses minimize button 190 on remote control 86, a signal to display a diminished image of the displayed advertisement is sent to receiver 64. In response to the signal, receiver 64 assembles and displays small image 182B (FIG. 13B). Similarly, when the user selects initial image 182A (FIG. 13A) of a displayed advertisement and presses maximize button 188, a signal to display an enlarged image of the displayed advertisement is sent to receiver 64. Receiver 64 then assembles and displays large image 182C (FIG. 13C).

Another example of user interaction with displayed advertisements is illustrated in FIGS. 15-18. According to the present invention the user may request additional information or place orders in response to a displayed advertisement. In order to request additional information, the user selects the advertisement by pressing enter button 186 on remote control 86 when the highlight bar is positioned over the advertisement image. By selecting an advertisement, the user signals the receiver to display additional information associated with the displayed advertisement, purchase a product in response to the advertisement, or order additional information, such as brochures or samples related to the displayed advertisement.

Figure 15A:
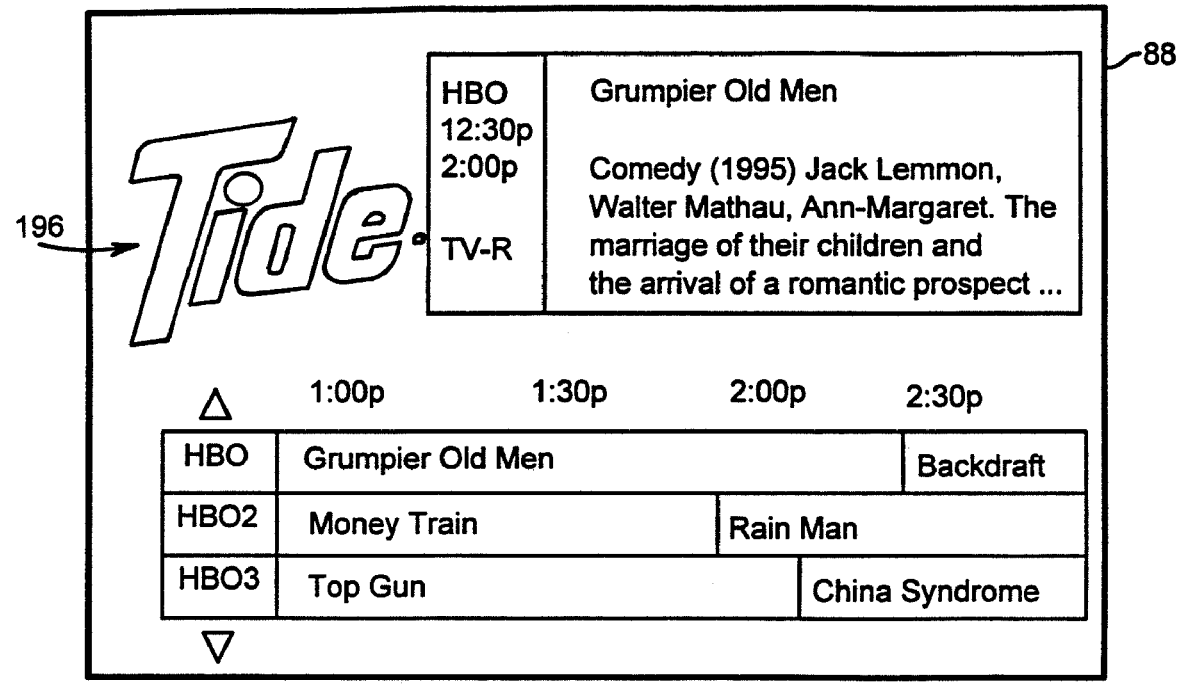
FIGS. 15A and 15B are diagrams illustrating how a user orders a sample product in response to an advertisement.
Figure 15B:
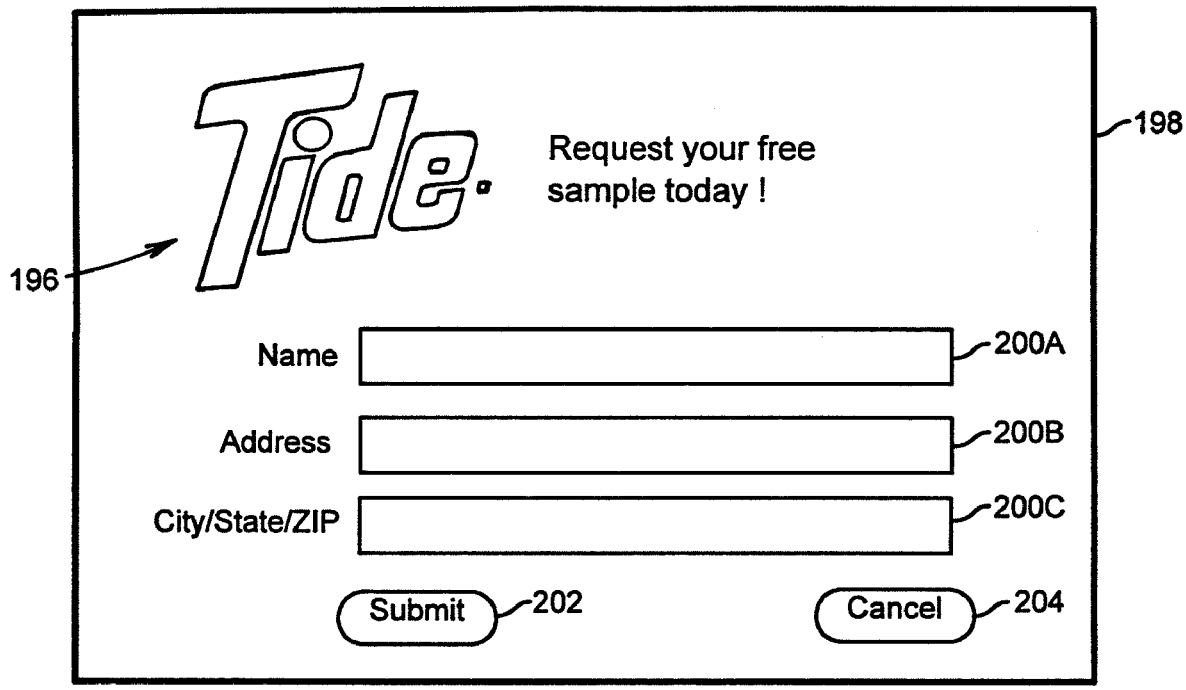

For example, the user may respond to advertisement 196 for laundry detergent displayed in program guide 88 as shown in FIG. 15A. The user interested in displayed advertisement 196 selects the image by moving the highlight bar over displayed advertisement 196 and pushing enter button 186 on remote control 86. Receiver 64 responds to the user's request by displaying an input request such as order screen 198 shown in FIG. 15B. Order screen 198 offers the user more information, brochures or samples related to displayed advertisement 196. Order screen 198 prompts a user to enter his name address by displaying input fields, such as, name field 200A, address field 200B and City/State/ZIP field 200C.

Letters and numbers may be entered into the fields by using the navigation buttons 184A-184D to scroll through the alphabet and by using number pad 192 on remote control 86. Various other fields such as an email address field, receiver number field and receiver model field may be included or substituted for the fields shown on order screen 198. Once the requested information has been entered, the user sends the order by highlighting submit button 202 on order screen 198 and pressing enter button 186 on remote control 86. At any time before submitting an order, a user can return to program guide 88 by highlighting cancel button 204 on order screen 198 and pressing enter button 186 on remote control 86. Other methods of displaying an ordered message may be employed according to the present invention such as simply overlaying the ordered message on the current screen the user is viewing.

Figure 16:
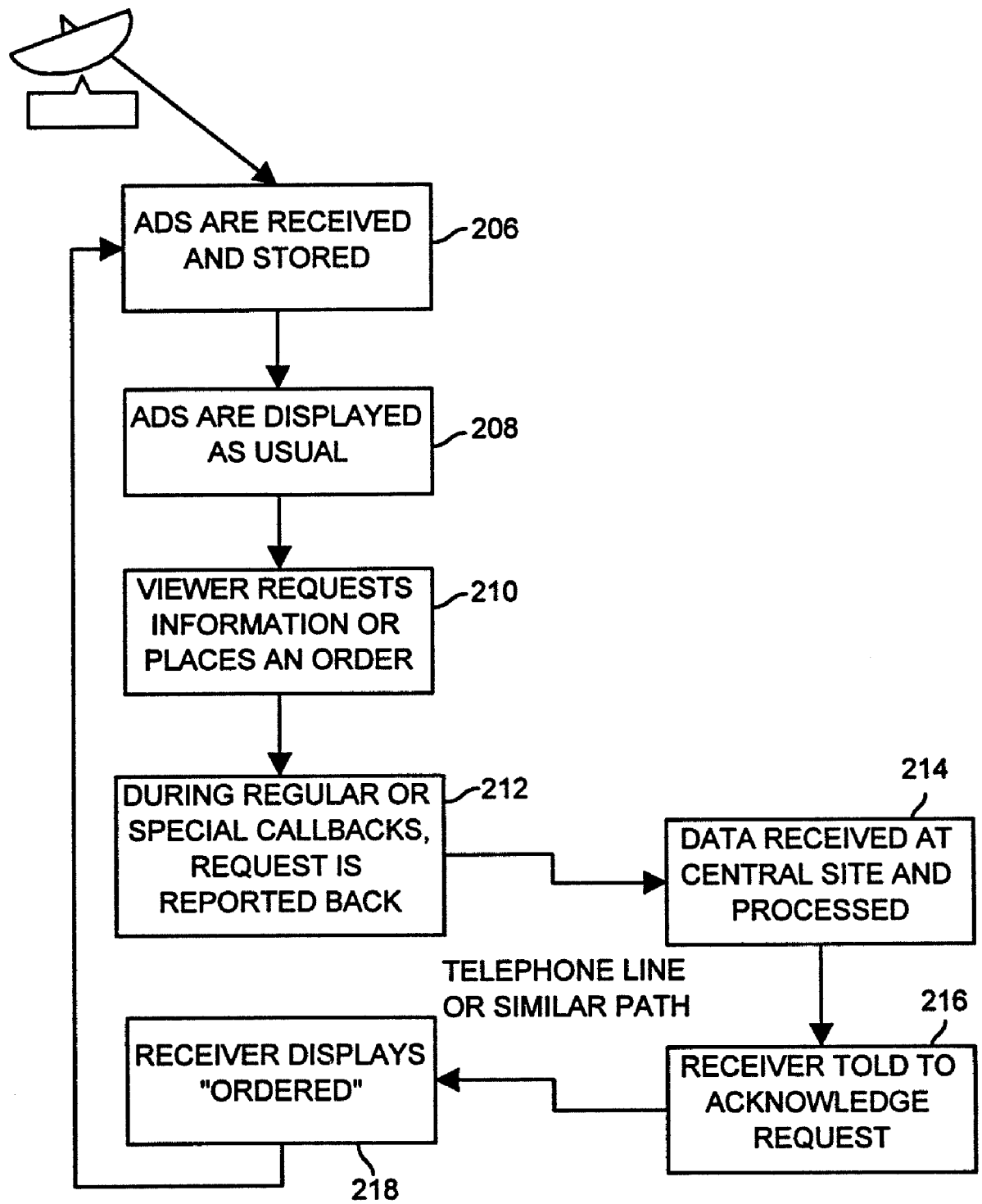
FIG. 16 is a block diagram illustrating how orders placed by a user in response to advertisements are processed.

FIG. 16 illustrates how user requests are processed. Receiver 64 saves the user request and later communicates the request to transmission station 26 which acts as a central processing station where user requests are processed. As advertisements are received, receiver 64 displays advertisements in program guide 88 according to the similarity score calculated by CPU 74 (Blocks 206 & 208, respectively). When a user requests information or places an order by selecting an advertisement, CPU 74 stores the request in a callback table in memory 78 (Block 210). Receiver 64 periodically calls transmission station 26 through interface 82, which is preferably connected to a telephone jack, and passes along the requests stored in the callback table (Block 212). User requests are processed at transmission station 26 (Block 214).

After receiver 64 has sent the stored requests to transmission station 26, receiver 64 acknowledges (Block 216) the request. Transmission station 26 sends an acknowledgment signal to receiver 64. When receiver 64 receives the acknowledgment signal, receiver 64 displays an "ordered" message to the user in a request summary screen (Block 218) and deletes from memory 78 the acknowledged requests.

Figure 17:
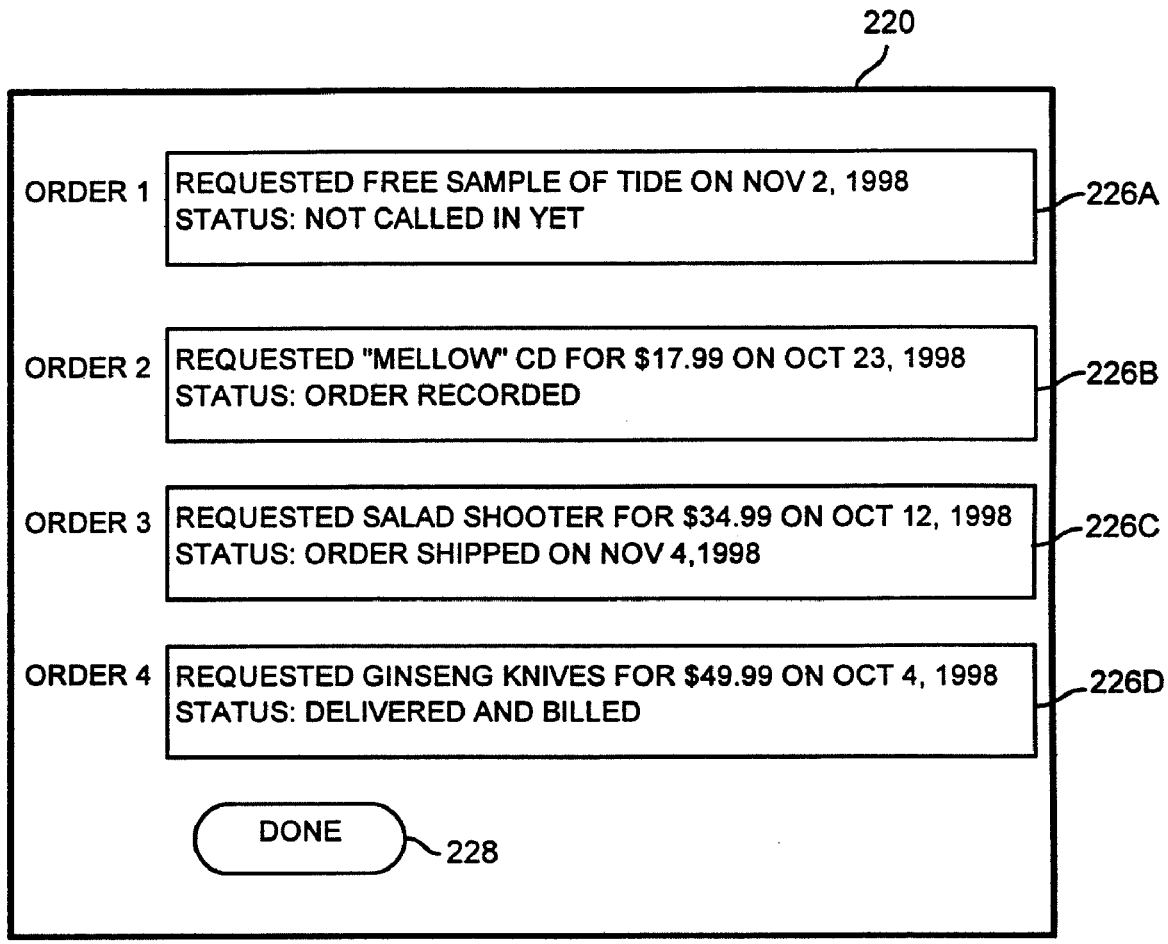
FIG. 17 is a diagram of a request summary screen that displays the orders placed by a user.
Figure 18:
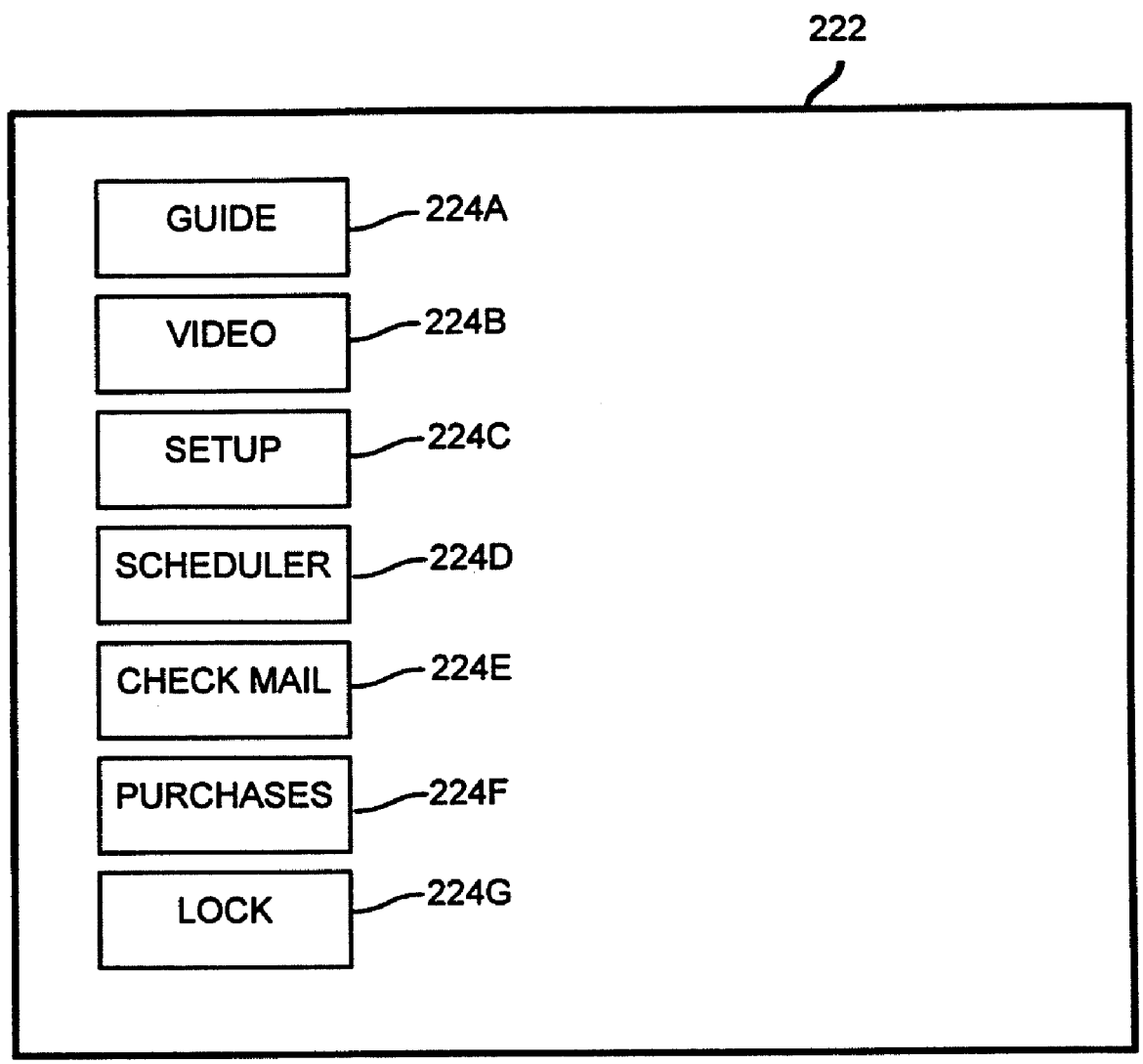
FIG. 18 is a diagram illustrating a menu used to access the screen of FIG. 17.

An example of how an ordered message may be displayed in request summary screen 220 is shown in FIG. 17. Receiver 64 displays a log of the requests the user has made in response to advertisements receiver 64 has displayed. A user can access the status of the requests by pressing menu button 194 on remote control 86 to bring up menu screen 222 shown in FIG. 18. Menu screen 222 displays buttons 224A-224G. User highlights requests button 224F (here titled "Purchases") with remote control 86 and presses enter to bring up request summary screen 220 (FIG. 17). Request windows 226A-226D in request summary screen 220 display the status of the user's requests. When a request by the user has been acknowledged by transmission station 26 the ordered message is displayed in one of corresponding request windows 226A-226D.

For example, as shown in FIG. 17 request window 226B shows the status of the "Mellow" CD request as "order recorded" which indicates that transmission station 26 has acknowledged the request. Other request status descriptions may be displayed in request summary screen 220, such as "not called in yet" (226A) which indicates the request was not included in the last call back between receiver 64 and transmission station 26, "order shipped" (226C), "delivered and billed" (226D), and so on. Additional information can be included in the request windows, such as when the user made the request, the name of the product requested and, if applicable, the price of the product requested. The additional information is communicated to receiver 64 in the same manner user requests are communicated during periodic calls to transmission station 26. When finished viewing request summary screen 220, the user returns to menu screen 222 (FIG. 18) by highlighting and selecting the done button 228 with remote control 86.

Another feature of the present invention provides for a statistical accounting of the advertisements displayed to a user. The statistics provide valuable information which may later be used by the broadcast provider or advertisers to better target and price advertising. According to the present invention, advertising statistics for a user are reported to transmission station 26. Advertising statistics include the number of times a particular advertisement is displayed to a particular viewer, the number of times a user has selected the advertisement, or which advertisements prompted the user to request additional information such as brochures or samples.

Figure 19:
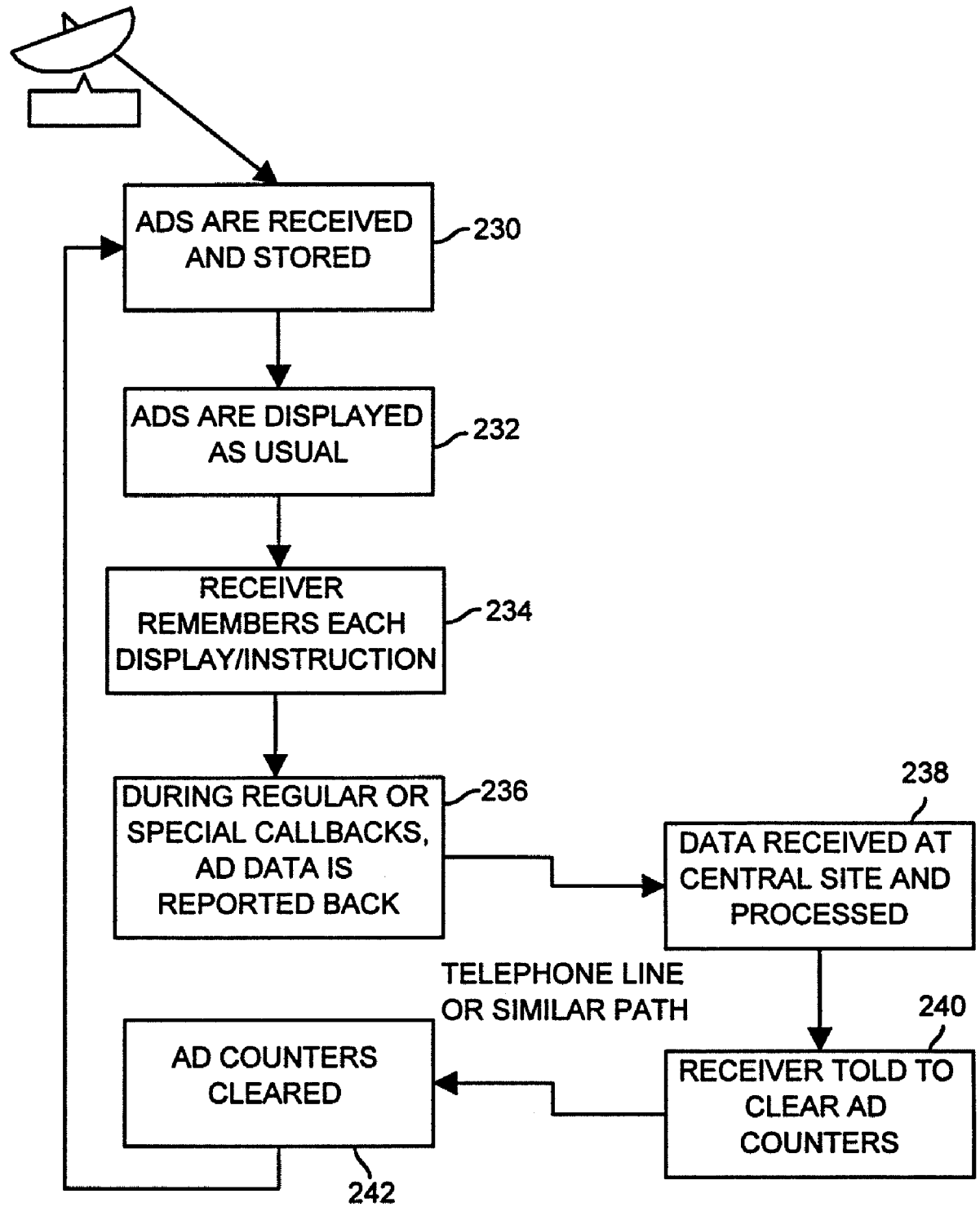
FIG. 19 is a block diagram illustrating how statistics for a user's viewing history are processed.

Another aspect of the present invention involves compiling and reporting statistics on what advertisements are shown and reacted to by an individual user. The block diagram in FIG. 19 illustrates how advertising statistics are reported to a central processing site according to the present invention. Advertisements are received, stored and displayed as previously discussed (Blocks 230 & 232). Receiver 64 counts and stores the number of times an advertisement is displayed and each user interaction with a particular advertisement in a statistics table in memory 78 (Block 234). Receiver 64 periodically calls transmission station 26 to report the viewing and advertising preferences for the user (Block 236). Transmission station 26 processes the received statistical data (Block 238). Once the statistics have been received by the transmission station 26, transmission station 26 sends a signal to clear the stored statistics and receiver 64 removes the stored statistics from memory (Blocks 240 & 242). The statistics compiled at the central transmission station may be used to determine the effectiveness of advertisements and to more precisely price advertisements.

The present invention provides a method and apparatus to intelligently tailor the display of advertisements to individual users of a television broadcast system. Rather than displaying to the user whatever advertisements happen to be broadcast, the present invention provides for flexibly and intelligently tailoring advertisements to each individual user. The present invention tracks individual users and the programming choices they make and uses that information to tailor what advertisements are displayed to each individual user. The present invention makes it possible for each individual user to have a unique viewing experience both with regard to the programming he or she chooses, and with regard to the advertisements he or she chooses. In addition, advertisers can be better assured that users most interested in particular advertisements actually see those advertisements.

The above examples of intelligently displayed advertising are merely illustrative of the present invention, and are not the only ways in which the present invention may be implemented. Although the present invention has been described with reference to preferred embodiments, workers skilled in the art will recognize that changes may be made in form and detail without departing from the spirit and scope of the invention.

What is claimed is:

1. A system for use in displaying advertisements within an electronic program guide, the system comprising:
    a receiver configured to receive a broadcast signal comprising a plurality of advertisements having a set of advertisement attributes and a plurality of television programs having a set of program attributes, the receiver further configured to separate the plurality of advertisements from the plurality of television programs;
    a memory coupled to the receiver to store the plurality of advertisements and the set of advertisement attributes;
    a controller coupled to the receiver and the memory, the controller configured to store the set of program attributes in a selection history table in the memory, to identify a first advertisement based on a correlation between the set of program attributes stored in the selection history table and the advertisement attributes associated with the first advertisement, to identify one of a plurality of versions of the first advertisement based on a comparison of the correlation and a threshold value; wherein the plurality of versions of the first advertisement comprises advertisements of different display sizes, and wherein the controller is to output for display the identified display size version of the first advertisement within the electronic program guide.

2. The system of claim 1, wherein the selection history table includes a plurality of selection histories and each of the selection histories contains program attributes associated with television programs selected by one of a plurality of users.

3. The system of claim 1, wherein the program attributes and the advertisement attributes include category information.

4. The system of claim 1, wherein the program attributes and the advertisement attributes include key words and phrases.

5. The system of claim 1, wherein the program attributes and the advertisement attributes include series information.

6. The system of claim 1, wherein the program attributes and the advertisement attributes include group information.

7. The system of claim 1, wherein the program attributes and the advertisement attributes include credits information.

8. The system of claim 1, wherein the program attributes and the advertisement attributes include name information.

9. The system of claim 1, wherein each of the plurality of advertisements includes an advertising object having attributes characterizing the content of the advertisement and wherein the advertising object points to a content object having advertising content.

10. The system of claim 9, wherein the content object is a hyper text markup language object.

11. The system of claim 1, further comprising a remote control configured to communicate first and second television program selections by the user, wherein the receiver is configured to identify an elapsed time between the first television program selection and the second television program selection, and the controller is configured to store the program attributes associated with a first television program associated with the first television program selection if the elapsed time is within a predetermined time period.

12. The system of claim 11, wherein the predetermined time period is greater than about 5 minutes and less than about 12 hours.

13. The system of claim 1, wherein a group of television programs from the plurality of television programs is selected by the user with a remote control, the controller stores the program attributes associated with the group of television programs in the selection history table, the controller calculates a similarity score for each of the plurality of advertisements stored in the memory based on the correlation between the advertisement attributes associated with each of the plurality of advertisements and the program attributes stored in the selection history table, the controller calculates a similarity score for a subsequently received advertisement based on a correlation between advertisement attributes associated with the subsequently received advertisement and the program attributes stored in the selection history table, and the controller identifies and replaces a stored advertisement having the lowest similarity score with the subsequently received advertisement.

14. The system of claim 13, wherein each of the plurality of advertisements comprises a plurality of advertisement images and wherein the controller selects an image from the plurality of advertisement images based on the similarity score for each of the plurality of advertisements.

15. The system of claim 14, wherein the remote control comprises a set of image altering buttons that select and modify advertisement images.

16. The system of claim 15, wherein one of the image altering buttons causes an advertisement image to be enlarged.

17. The system of claim 15, wherein one of the image altering buttons causes an advertisement image to be reduced.

18. The system of claim 15, wherein one of the image altering buttons causes an advertisement image to be deleted.

* * * * *